(12) United States Patent
Nagare et al.

(10) Patent No.: US 10,650,498 B2
(45) Date of Patent: May 12, 2020

(54) SYSTEM, METHOD, AND NON-TRANSITORY, COMPUTER-READABLE MEDIUM CONTAINING INSTRUCTIONS FOR IMAGE PROCESSING

(71) Applicant: NEC Corporation, Tokyo (JP)

(72) Inventors: Madhuri Mahendra Nagare, Tokyo (JP); Eiji Kaneko, Tokyo (JP); Masato Toda, Tokyo (JP); Masato Tsukada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 104 days.

(21) Appl. No.: 16/052,612

(22) Filed: Aug. 2, 2018

(65) Prior Publication Data
US 2020/0043136 A1 Feb. 6, 2020

(51) Int. Cl.
*G06T 5/00* (2006.01)
*G06T 7/90* (2017.01)

(52) U.S. Cl.
CPC ............... *G06T 5/002* (2013.01); *G06T 7/90* (2017.01); *G06T 2207/10036* (2013.01)

(58) Field of Classification Search
CPC .. G06T 5/002; G06T 7/90; G06T 2207/10036
See application file for complete search history.

(56) References Cited

U.S. PATENT DOCUMENTS

| 5,621,526 A | 4/1997 | Kuze | |
|---|---|---|---|
| 2005/0012035 A1* | 1/2005 | Miller | ..................... G01W 1/00 250/226 |
| 2005/0175253 A1 | 8/2005 | Li et al. | |

(Continued)

FOREIGN PATENT DOCUMENTS

| EP | 1869641 B1 | 8/2017 |
|---|---|---|
| JP | 2001-143054 A | 5/2001 |

(Continued)

OTHER PUBLICATIONS

Meng Xu, Mark Pickering, Antonio J Plaza, Xiuping Jia, "Thin Cloud Removal Based on Signal Transmission Principles and Spectral Mixture Analysis", IEEE Transactions on Geoscience and Remote Sensing, vol. 54, No. 3, Mar. 2016, pp. 1659-1669, 11pp.

(Continued)

*Primary Examiner* — Asghar H Bilgram
(74) *Attorney, Agent, or Firm* — Hauptman Ham, LLP

(57) ABSTRACT

An image processing system includes a storage device, and a processor coupled to the storage device and configured to extract, from an input image, an aerosol spectrum across a plurality of wavelength bands of the input image. The storage device contains therein a database storing a plurality of predetermined aerosol spectra, and a plurality of corresponding values associated with an aerosol optical property at the plurality of wavelength bands. The processor is further configured to retrieve, from the database, values associated with the aerosol optical property at the plurality of wavelength bands, the retrieved values corresponding to the extracted aerosol spectrum. The processor is further configured to correct the input image, by using the retrieved values associated with the aerosol optical property at the plurality of wavelength bands, to generate a corrected image.

20 Claims, 11 Drawing Sheets

(56) References Cited

U.S. PATENT DOCUMENTS

| | | | | |
|---|---|---|---|---|
| 2009/0214084 A1* | 8/2009 | Asner | ................ | G06K 9/00657 382/110 |
| 2012/0281085 A1* | 11/2012 | Ingram, Jr. | .......... | G06K 9/0063 348/135 |
| 2016/0259962 A1* | 9/2016 | Ardouin | .................... | G06K 9/46 |
| 2017/0277969 A1 | 9/2017 | Ardouin et al. | | |
| 2018/0144447 A1* | 5/2018 | Tate | ........................ | G06T 5/003 |

FOREIGN PATENT DOCUMENTS

| | | |
|---|---|---|
| JP | 2010-251958 A | 11/2010 |
| JP | 2014-48131 A | 3/2014 |
| JP | 2015-28759 A | 2/2015 |
| JP | 2017-68456 A | 4/2017 |
| JP | 2017-198464 A | 11/2017 |
| WO | 2018/037920 A1 | 3/2018 |
| WO | 2019/049324 A1 | 3/2019 |

OTHER PUBLICATIONS

Chapter 7—Estimation of Parameters, http://www.fao.org/docrep/006/X8498E/x8498e0e.htm, retrieved Jul. 19, 2018, 25pp.

John A, Richards, Xiuping Jia, "Remote Sensing Digital Image Analysis", Springer, Section: 8.9.4, 2006, p. 232 to 242, Berlin, Germany, 33pp.

Madhuri Nagare et al., "A Unified Method of Cloud Detection and Removal Robust to Spectral Variability", IEEE International Geoscience and Remote Sensing Symposium, Dec. 4, 2017, pp. 5418-5421, doi:10.1109/IGARSS.2017.8128229, 4pp.

Takahiro Toizumi et al., "Cloud Removal from Satellite Images Using Fusion of Cloud Texture Analysis and Generative Adversarial Networks", Forum on Information Technology 2018, Sep. 12, 2018, H-009, pp. 107-108, Japan, 2pp.

Madhuri Nagare et al., "Cloud Shadow Removal Based on Cloud Transmittance Estimation", IEEE International Geoscience and Remote Sensing Symposium, Nov. 5, 2018, pp. 4031-4034, doi:10.1109/IGARSS.2018.8517580, 4pp.

Takahiro Toizumi et al., "Artifact-Free Thin Cloud Removal Using Gans", IEEE International Conference on Image Processing, Aug. 26, 2019, pp. 3596-3600, doi:10.1109/ICIP.2019.8803652, 5pp.

International Search Report and Written Opinion in PCT Application No. PCT/JP2019/029919, dated Oct. 15, 2019, 9pp.

* cited by examiner

| Cloud type | Cloud spectrum | Cloud thickness | Wavelengths-wise Cloud Transmittance ||||||| 
| | | | Band 1 | Band 2 | Band 3 | Band 4 | Band 5 | Band 6 | Band 7 |
| --- | --- | --- | --- | --- | --- | --- | --- | --- | --- |
| Cloud 1 | [0.268023, 0.255365, 0.230974, 0.236826, 0.338285, 0.339504, 0.292430] | 0.2 | 0.9955 | 0.9968 | 0.9983 | 0.9992 | 0.9998 | 1.0000 | 1.0000 |
| | | 0.4 | 0.9783 | 0.9831 | 0.9897 | 0.9941 | 0.9982 | 1.0000 | 1.0000 |
| | | 0.6 | 0.9211 | 0.9333 | 0.9527 | 0.9672 | 0.9845 | 0.9992 | 0.9999 |
| | | 0.8 | 0.7449 | 0.7669 | 0.8061 | 0.8380 | 0.8837 | 0.9737 | 0.9922 |
| Cloud 2 | [0.290042, 0.287842, 0.262772, 0.270528, 0.371271, 0.364261, 0.315229] | 0.2 | 0.9955 | 0.9968 | 0.9983 | 0.9992 | 0.9998 | 1.0000 | 1.0000 |
| | | 0.4 | 0.9783 | 0.9830 | 0.9897 | 0.9940 | 0.9982 | 1.0000 | 1.0000 |
| | | 0.6 | 0.9209 | 0.9330 | 0.9523 | 0.9669 | 0.9845 | 0.9992 | 0.9999 |
| | | 0.8 | 0.7442 | 0.7657 | 0.8046 | 0.8366 | 0.8838 | 0.9739 | 0.9923 |
| Cloud 3 | [0.324159, 0.314304, 0.288921, 0.298798, 0.402801, 0.393224, 0.348974] | 0.2 | 0.9955 | 0.9968 | 0.9983 | 0.9992 | 0.9998 | 1.0000 | 1.0000 |
| | | 0.4 | 0.9783 | 0.9830 | 0.9896 | 0.9940 | 0.9982 | 1.0000 | 1.0000 |
| | | 0.6 | 0.9209 | 0.9330 | 0.9522 | 0.9668 | 0.9846 | 0.9992 | 0.9999 |
| | | 0.8 | 0.7447 | 0.7657 | 0.8042 | 0.8361 | 0.8840 | 0.9740 | 0.9923 |
| ... | | | ... | ... | ... | ... | ... | ... | ... |
| Cloud N | [0.465346, 0.467995, 0.445105, 0.468594, 0.575583, 0.468604, 0.369260] | 0.2 | 0.9955 | 0.9967 | 0.9983 | 0.9992 | 0.9998 | 1.0000 | 1.0000 |
| | | 0.4 | 0.9781 | 0.9826 | 0.9893 | 0.9938 | 0.9982 | 1.0000 | 1.0000 |
| | | 0.6 | 0.9202 | 0.9316 | 0.9508 | 0.9657 | 0.9844 | 0.9992 | 0.9999 |
| | | 0.8 | 0.7419 | 0.7609 | 0.7986 | 0.8307 | 0.8829 | 0.9749 | 0.9928 |

Fig. 2

SYSTEM, METHOD, AND NON-TRANSITORY, COMPUTER-READABLE MEDIUM CONTAINING INSTRUCTIONS FOR IMAGE PROCESSING

BACKGROUND

The present disclosure relates to an image processing system, an image processing method, and a non-transitory, computer-readable medium containing instructions for image processing, in particular, for correcting pixels affected by clouds or other types of aerosols in images captured by sensors on space-borne and/or air-borne platforms.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is a diagram of a table in a database, in accordance with some embodiments.

DETAILED DESCRIPTION

Figure 1:
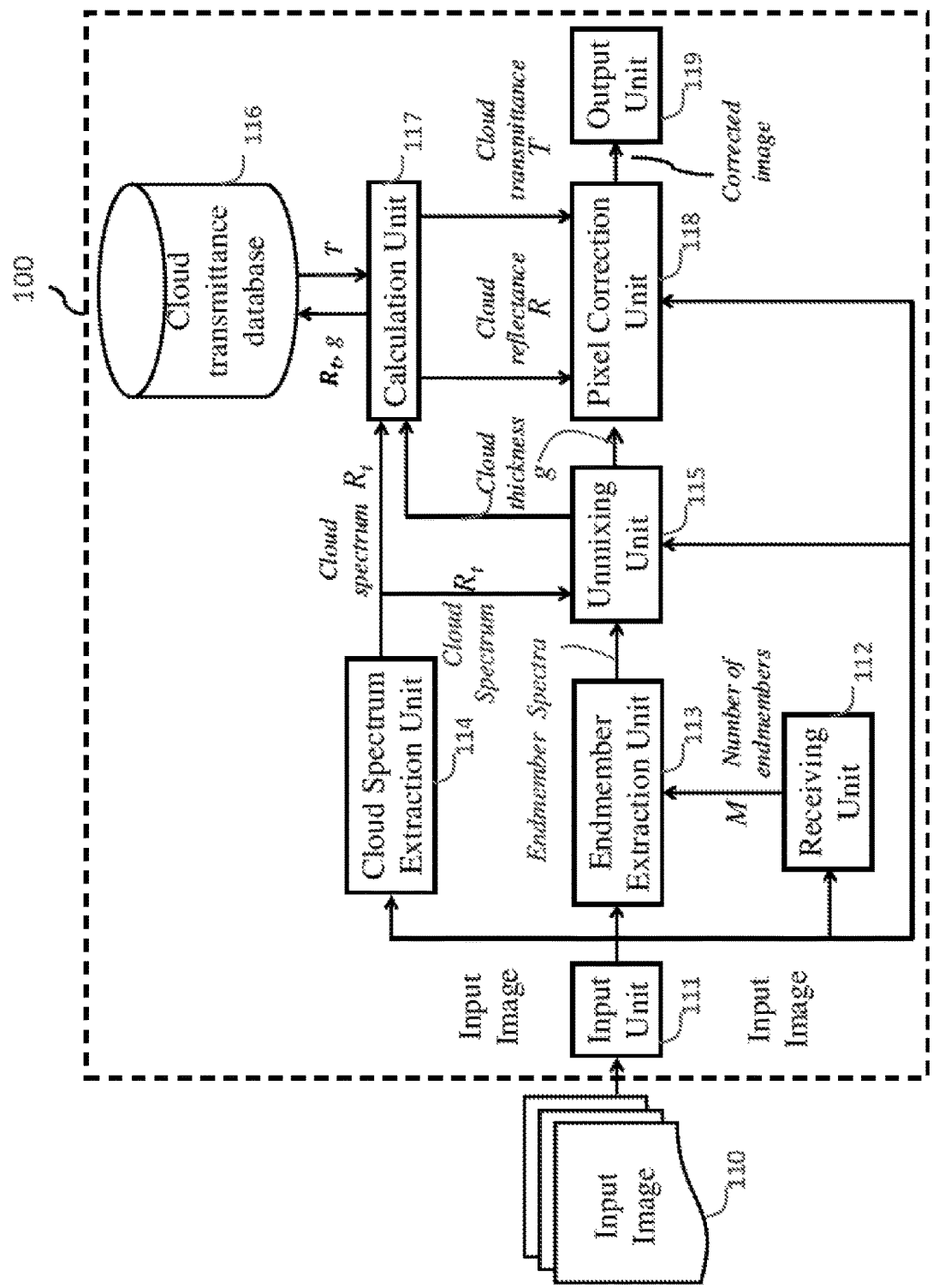
FIG. 1 is a block diagram of an image processing system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Although example embodiments specifically described herein refer to "cloud," "cloud removal," "cloud optical property," "cloud spectrum," "cloud thickness," etc., the present disclosure is not limited to "cloud." For example, some embodiments are applicable to an image processing system, method or non-transitory, computer-readable medium containing instructions for removing effects or influences of aerosols present in satellite or aerial images. As used herein, "aerosol" is a suspension of solid particles or liquid droplets in the atmosphere. Examples of aerosol include, but are not limited to, naturally occurring aerosols such as cloud, fog, dust, forest exudates, geyser steam, volcano ashes, etc., as well as man-made aerosols such as air pollutants and smoke, etc. "Aerosol optical property" refers to an optical property, such as transmittance or reflectance, of an aerosol. Thus, "aerosol transmittance" and "aerosol reflectance" refer to transmittance and reflectance, respectively, of an aerosol. Likewise, "cloud optical property" refers to an optical property, such as transmittance or reflectance, of a cloud. Thus, "cloud transmittance" and "cloud reflectance" refer to transmittance and reflectance, respectively, of a cloud. Although examples of "optical property" in the embodiments specifically described herein include transmittance and reflectance, other optical properties, such as, absorptance, are within the scopes of various embodiments.

Satellite or aerial images are information sources for monitoring the Earth's surface. However, when a cloud is present in a satellite or aerial image, the image's reliability for a subsequent application is limited. Therefore, pixels affected by clouds in a satellite or aerial image are detected and/or corrected by an image processing tool referred to as cloud removal. In some embodiments, considerations of wavelength dependency and/or cloud type in obtaining a cloud optical property, e.g., cloud transmittance, provide improvements in accuracy of cloud removal, compared to some other approaches that do not consider wavelength dependency and/or cloud type.

More specifically, satellite or aerial images are captured by sensors on space-borne or air-borne platforms. Many space-borne or air-borne platforms have sensors capable of capturing multispectral or hyperspectral images of the ground from which it is possible to extract much more detailed information about characteristics of ground objects than RGB images. A multispectral image is an image which includes response of a scene at multiple and specific wavelength bands in the electromagnetic spectrum. Generally images having more than three (RGB) bands are referred to as multispectral images. A multispectral image includes several (more than three) layers of images of the same area or scene, each of the image layer is taken in a corresponding wavelength band in the electromagnetic spectrum. The set of such images taken across different wavelength bands together forms a multispectral image. In some embodiments, a multispectral image includes about 4-7 wavelength bands. A hyperspectral image is similar to a multispectral image, but includes a higher number (e.g., hundreds) of narrower wavelength bands. As used herein, "hyperspectral image" is also referred to as "multispectral image." Further, unless otherwise specified, "image," "input image," "corrected image" and "processed image" used herein are multispectral images.

Satellite or aerial images are affected by the weather conditions at the time of capturing. Around two-thirds of the Earth's surface is covered by clouds throughout the year. Therefore, it is difficult to get a cloud-free scene for all images. A cloud cover (a surface area of a cloud visible in an image) in an image poses a limitation on the use of satellite images in advanced image processing operations such as land use land cover classification etc. If images with a cloud cover are directly used for a high level analysis, then unreliable results are likely obtained. Therefore, the correction of pixels affected by clouds is a preprocessing tasks.

There can be many types of clouds and different layers of clouds in an image. A thick cloud means an atmospheric cloud which blocks the sensor view completely while a thin cloud blocks the view partially. If a cloud is thin enough then it is possible to retrieve the ground information beneath to some extent from the given single image itself. If a cloud is too thick and thereby blocks (occludes) the complete radiation then it is difficult, potentially impossible, to retrieve the ground information beneath from the given single image. Therefore, in case of a thick cloud, pixels containing the cloud are detected and masked to avoid false analyses. Information beneath a thick cloud is recoverable from other sources of information, if available. Pixels affected by a thin cloud are corrected as described herein.

Figure 10:
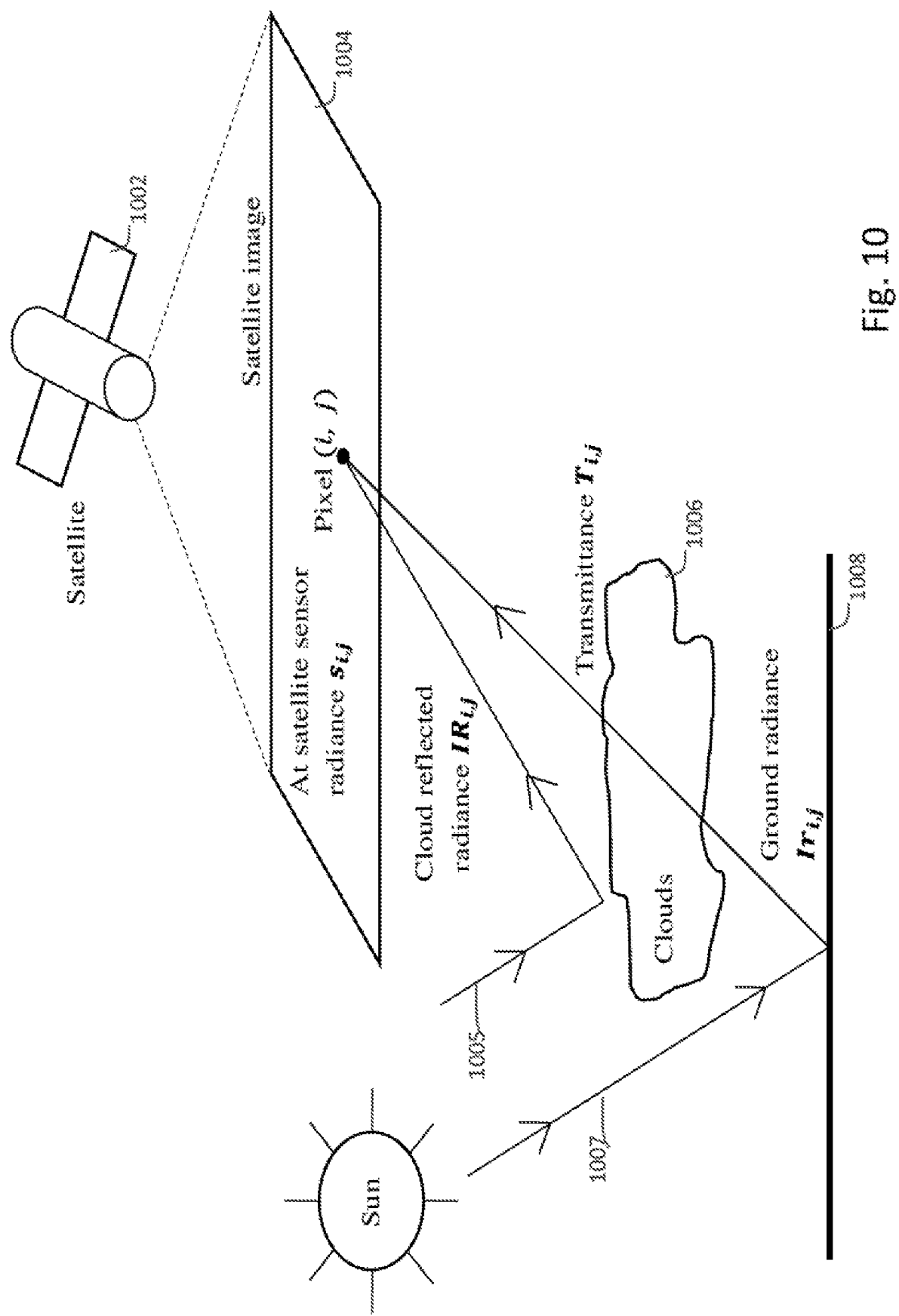
FIG. 10 is a schematic diagram of a physical model of radiative transfer in the presence of a cloud, in accordance with some embodiments.

FIG. 10 is a schematic diagram of a physical model of radiative transfer in the presence of a cloud for image processing or image correction, in accordance with some embodiments. A space-borne or an air-borne platform, e.g., satellite 1002, has one or more sensors (not shown) that capture(s) satellite or aerial image 1004 of the Earth's surface, e.g., ground 1008. Image 1004 includes a plurality of pixels arranged in a two dimensional array of a plurality of columns and a plurality of rows. In FIG. 10, each pixel is indicated as pixel (i,j), where i and j are natural numbers indicating the column ($i^{th}$) and row ($j^{th}$) at which pixel (i,j) is located. A radiance of pixel (i,j) in image 1004 is designated as $s_{i,j}$. In the presence of clouds, the radiance $s_{i,j}$ is affected by both cloud reflectance and cloud transmittance. Cloud reflectance is illustrated in FIG. 10 as light ray 1005 from the sun, reflected off cloud 1006, and then captured by the one or more sensors of satellite 1002. Cloud transmittance is illustrated in FIG. 10 as light ray 1007 from the sun, reflected off ground 1008, transmitted through cloud 1006, and then captured by the one or more sensors of satellite 1002.

The physical model of radiative transfer in the presence of cloud 1006 is given by the following Equation:

$$s_{i,j}(\lambda) = I_{i,j}(\lambda) \times r_{i,j}(\lambda) \times T_{i,j}(\lambda) + I_{i,j}(\lambda) \times R_{i,j}(\lambda), \quad (1)$$

where quantities s, r, I, T, R are observed for a wavelength band λ and for pixel (i,j), "I" is the solar irradiance, "s" is a radiance received at the one or more sensors of satellite 1002, "r" is a reflectance from ground 1008, "T" and "R" are cloud transmittance and cloud reflectance, respectively.

Assuming that solar irradiance received by ground 1008 and cloud 1006 is the same, then expressing input radiance in terms of reflectance and cancelling out the solar irradiance transfer Equation (1) to the following Equation $$x_{i,j}(\lambda) = r_{i,j}(\lambda) \times T_{i,j}(\lambda) + R_{i,j}(\lambda), \quad (2)$$

$$\therefore r_{i,j}(\lambda) = \frac{x_{i,j}(\lambda) - R_{i,j}(\lambda)}{T_{i,j}(\lambda)},$$

where $x_{i,j}(\lambda)$, derived from radiance $s_{i,j}(\lambda)$, is the reflectance received at the one or more sensors of satellite 1002 for pixel (i,j) and wavelength band λ.

Equation (2) assumes that the input image is corrected for atmospheric effects and thus the sunlight attenuation coefficient due to the atmosphere is 1. A pixel (i,j) affected by cloud 1006 is corrected to retrieve the ground reflectance $r_{i,j}$ by substituting values for $x_{i,j}$, $T_{i,j}$, $R_{i,j}$ in Equation (2). While values of $x_{i,j}$ are determined from data captured by the one or more sensors of satellite 1002, values of cloud transmittance $T_{i,j}$ and cloud reflectance $R_{i,j}$ are generally unknown.

A technique employing the physical model described above is provided to derive values for cloud transmittance along with cloud reflectance. In this technique, a pixel is assumed to be a mixture of endmembers, and abundance of each endmember in the pixel is estimated. An endmember is a pure class on the ground. For each pixel in an input image, a cloud is assumed as an endmember and cloud abundance at the pixel is estimated. Cloud abundance is equivalent to cloud thickness. To derive the cloud abundance, a cloud spectrum is extracted from the input image. Then, cloud transmittance and cloud reflectance values are derived from the estimated cloud abundance values and the extracted cloud spectrum, using, for example, the following Equations:

$$R_{i,j}(\lambda) = g_{i,j} R_t(\lambda), \quad (3)$$

$$T_{i,j}(\lambda) = 1 - g_{i,j}, \quad (4)$$

where $R_t(\lambda)$ is a reflectance value for wavelength band λ in a cloud spectrum $R_t$, and $g_{i,j}$ is a scaling factor, referred to as relative thickness of a cloud, for the pixel (i,j). The scaling factor "g" of a cloud varies from 0 to 1 according to relative thickness of the cloud with respect to thick clouds. Scaling factor "g" is 1 for thick clouds. The thick clouds are opaque clouds for which cloud transmittance is 0. The value of g varies from one pixel to another. The scaling factor g is independent of wavelength. Consequently, when cloud transmittance $T_{i,j}$ is determined by Equation (4), cloud transmittance $T_{i,j}$ is also independent of wavelength band A.

When $T_{i,j}(\lambda)$ and $R_{i,j}(\lambda)$ determined by Equations (3) and (4) are substituted into Equation (2), the following Equation is obtained, considering a matrix form of $x(\lambda)$, $r(\lambda)$, $R_t(\lambda)$:

$$x_{i,j} = (1-g) r_{i,j} + g R_t, \quad (5)$$

When L is the number of wavelength bands (i.e., the number of image layers) present in the input multispectral image, then "$x_{i,j}$" is an L×1 column vector ($[x_{i,j}(\lambda_1) \ldots x_{i,j}(\lambda_L)]^T$) comprising the spectral reflectance of a pixel (i,j) in L wavelength bands $\lambda_1, \ldots, \lambda_L$, as observed by the one or more sensors of satellite 1002 for the pixel (i,j). Similarly, "$r_{i,j}$" is an L×1 column vector of the ground reflectance for the pixel (i,j), and "$R_t$" is an L×1 column vector of the cloud spectrum (spectral signature). A spectrum (spectral signature) of an object or pixel in an input image means a reflectance spectrum being a set of reflectance values of the object or pixel, one reflectance value for each wavelength band in the input image.

For brevity, the subscript (i,j) is ignored in the next discussion. However, all quantities are defined for a pixel (i,j). In Equation (5), r is modelled as a linear mixture of "M" endmembers as shown in the following Equation:

$$x = (1-g) \sum_{m=1}^{M} a_m s_m + g R_t + e, \quad (6)$$

such that, $$\sum_{m=1}^{M} a_m = 1, a_m \geq 0, 0 \leq g \leq 1, \quad (7)$$

where "$s_m$" is an L×1 spectral signature vector of the $m^{th}$ endmember, "$a_m$" is an abundance of the $m^{th}$ endmember at the pixel (i,j) under consideration, e is an L×1 column vector of the model error, and M is the number of endmembers other than a cloud in the image.

Considering a cloud as an $(M+1)^{th}$ endmember, Equations (6) and (7) are modified as follows:

$$x = \sum_{m=1}^{M+1} b_m s_m + e, \qquad (8)$$

where $b_{M+1}=g$, $S_{M+1}=R_t$, and $b_m=(1-g)a_m$, such that, $$\sum_{m=1}^{M+1} b_m = 1, 0 \leq b_m \leq 1 \qquad (9)$$

The model in Equations (8) and (9) is interpreted as follows: a cloud is an $(M+1)^{th}$ endmember and g is the abundance of the cloud. Thus, "g" which is a relative thickness factor of a cloud is interpreted as a cloud abundance for a pixel.

Equation (8) with constraints in Equation (9) is solved by the fully constrained linear mixture analysis algorithm to give an abundance of a cloud (and thus g). Equation (8) with constraints in Equation (9) is solvable as long as L>M+1. Therefore, this technique is suitable for multispectral or hyperspectral images.

By Equation (5), assuming the model error e to be 0 or negligible, the true reflectance of a pixel (i,j) is retrievable by the following Equation:

$$r = \frac{1}{(1-g)}(x - gR_t) \qquad (10)$$

Equation (10) indicates that a pixel (i,j) is not correctable if g=1, which implies the pixel covered by thick clouds (g=1) is to be masked out or replaced by another image source.

As described above, when cloud transmittance $T_{i,j}$ is determined by Equation (4), cloud transmittance $T_{i,j}$ is also independent of wavelength band A. The inventor(s) have/has realized that this simple assumption of a linear relationship between the cloud thickness and cloud transmittance is insufficient in some situations to accurately define the cloud transmittance. Specifically, a cloud is a complex mixture of water droplets, ice crystals, and particles etc., suspended in the atmosphere. Further, a cloud affects shorter wavelengths more than longer wavelengths. Moreover, different types of clouds has different types and proportions of constituents. Thus, given a cloud thickness, the cloud transmittance is not the same for all types of clouds at different wavelengths. As a result, the linear model given in Equation (4) to derive cloud transmittance is overly simplified, and using this linear model is unlikely to produce precisely correct results for cloud removal.

Accordingly, in some embodiments described herein, considerations are given to wavelength dependency and/or cloud type in obtaining a cloud optical property, e.g., cloud transmittance $T_{i,j}$, to improve upon accuracy of cloud removal in image processing.

FIG. 1 is a block diagram of an image processing system 100, in accordance with some embodiments. The image processing system 100 includes input unit 111, receiving unit 112, endmember extraction unit 113, cloud spectrum extraction unit 114, unmixing unit 115, cloud transmittance database 116, calculation unit 117, pixel correction unit 118, and output unit 119. In some embodiments, examples of input unit 111 include, but are not limited to, a card reader, a communication port, circuitry in a network interface, circuitry in an interface with a storage medium, or circuitry in an I/O interface etc., as described with respect to FIG. 11. In some embodiments, examples of output unit 119 include, but are not limited to, a display, a printer, a card reader, a communication port, circuitry in a network interface, circuitry in an interface with a storage medium, or circuitry in an I/O interface etc., as described with respect to FIG. 11. In some embodiments, cloud transmittance database 116 is stored in at least one storage device, as described with respect to FIG. 11. In some embodiments, cloud transmittance database 116 is stored in several storage devices distributed at different nodes in a network, such as a dedicated computer network or the Internet. In some embodiments, receiving unit 112, endmember extraction unit 113, cloud spectrum extraction unit 114, unmixing unit 115, calculation unit 117 and pixel correction unit 118 are implemented by at least one processor, as described with respect to FIG. 11. In some embodiments, receiving unit 112, endmember extraction unit 113, cloud spectrum extraction unit 114, unmixing unit 115, calculation unit 117 and pixel correction unit 118 are implemented by multiple processors distributed at different nodes in a network, such as a dedicated computer network or the Internet. In at least one embodiment where receiving unit 112 receives input from an operator, receiving unit 112 includes circuitry in an I/O interface etc., as described with respect to FIG. 11. In some embodiments, the at least one storage device and the at least one processor are included in the same computer system, for example, onboard an air-borne or space-borne platform with one or more sensors for capturing multispectral images, or at a ground station. In some embodiments, the at least one storage device and the at least one processor are included in different computer systems distributed, and coupled to each other, over a network.

Input unit 111 receives cloudy multispectral input image 110, for example, from sensors on an air-borne or space-borne platform, such as satellite 1002 via wireless communication, and sends input image 110 to receiving unit 112, endmember extraction unit 113, cloud spectrum extraction unit 114, unmixing unit 115, and pixel correction unit 118.

Receiving unit 112 determines the number of endmembers, M, other than a cloud in input image 110. In some embodiments, when L is the number of wavelength bands present in input image 110, then M, which is the number of endmembers, is automatically restricted to L minus 2, due to the constrains in Equation (9). In at least one embodiment, the number L of wavelength bands present in input image 110 is included in metadata enclosed by the one or more sensors of satellite 1002 with image data in input image 110. Alternatively, in some embodiments, an operator determines the number of endmembers in input image 110 by visual inspection, and enters the number of endmembers to receiving unit 112 via, e.g., a keyboard. Receiving unit 112 then sends the determined or entered number of endmembers to endmember extraction unit 113.

Endmember extraction unit 113 acquires input image 110, which is a multispectral cloudy image, from input unit 111 along with the number of endmembers from receiving unit 112, and extracts an equal number, i.e., M, of endmember spectra. Endmember extraction unit 113 then sends a set of the extracted endmember spectra to unmixing unit 115. An endmember means a pure land cover class in an image. A choice of the land cover class (endmember) depends on an application. For example, in a change detection application, endmembers are vegetation, water etc., while in a vegetation monitoring application, endmembers are cedar or cypress.

In some embodiments, representative pixels for an endmember in input image 110 are identified, e.g., by an operator. Then, a mean or average spectrum of the spectra (spectral reflectance x described herein) of the representative pixels is taken as an endmember spectrum by endmember extraction unit 113.

As an alternative, in some embodiments, endmember extraction unit 113 extracts M endmember spectra from input image 110 by employing an unsupervised endmember extraction algorithm, such as Pixel Purity Index, N-FINDR, and Vertex Component Analysis (VCA).

As a further alternative, in some embodiments, endmember extraction unit 113 performs the endmember extraction by clustering similar pixels is an unsupervised manner and then selecting endmember spectra as mean or average spectra of the respective clusters.

Cloud spectrum extraction unit 114 acquires input image 110, which is a multispectral cloudy image, from input unit 111 and extracts a cloud spectrum from input image 110, e.g., in the form of an L×1 column vector of the cloud spectrum $R_t$. In some embodiments, cloud spectrum extraction unit 114 extracts a cloud spectrum by employing spatial or spectral properties of a cloud in input image 110. For example, spatial properties of a cloud are low standard deviation, homogeneous texture, a less number of edges per unit length etc., while spectral properties of a cloud are high reflectance in visible and near infra-red bands, low temperature in thermal bands etc.

In at least one embodiment, cloud spectrum extraction unit 114 extracts a cloud spectrum from input image 110 as a spectrum of the brightest pixel in input image 110. Specifically, cloud spectrum extraction unit 114 extracts a cloud spectrum based on an assumption that a pure cloud pixel is much brighter than pixels belonging to the land surface in visible and near infrared bands. Accordingly, a cloud spectrum is extracted by searching for $$\arg\max_n \sum_{\lambda=1}^{L} x_n(\lambda) = n = 1, 2, \ldots N, \quad (11)$$

where $x_n(\lambda)$ is the reflectance of the $n^{th}$ pixel in the $\lambda^{th}$ wavelength band, and L and N are the number of wavelength bands and the total number of pixels in input image 110, respectively. As a result, a pixel with a maximum sum of reflectance over all wavelength bands of input image 110 is selected as a cloud pixel, and a spectrum corresponding to this cloud pixel is extracted as a cloud spectrum $R_t$. As described above, the spectrum corresponding to the cloud pixel is an L×1 column vector comprising the spectral reflectance (i.e., reflectance values observed by the one or more sensors of satellite 1002) of the cloud pixel in L wavelength bands of input image 110. Cloud spectrum extraction unit 114 sends the extracted cloud spectrum $R_t$ to unmixing unit 115 and calculation unit 117.

Unmixing unit 115 acquires input image 110 from input unit 111, a set of M endmember spectra from endmember extraction unit 113, and the extracted cloud spectrum $R_t$ from cloud spectrum extraction unit 114. For a spectrum of each pixel, unmixing unit 115 determines fractional abundances (a relative proportion of an endmember in a pixel) of all M endmembers and a cloud (as an (M+1)$^{th}$ endmember), by employing the input cloud spectrum $R_t$ and the M endmember spectra.

In some embodiments, unmixing unit 115 unmixes each pixel in input image 110 using Equation (8) by imposing constraints given by Equation (9) to give an abundance, i.e., relative thickness of a cloud. More specifically, for a spectrum of a pixel, unmixing unit 115 determines coefficients (e.g., b in Equation (8)) of a linear mixture model of (M+1) spectra of the M endmembers and the cloud, by an iterative least square approach, e.g., a fully constrained linear mixture analysis. The coefficients of the linear mixture model are fractional abundances of the endmembers and the cloud. Unmixing unit 115 performs unmixing such that if spectra of the endmembers and the cloud are scaled by the respective fractional abundance obtained and added linearly then the spectrum of the pixel (which has been unmixed) is obtained. The unmixing problem to be solved can be defined by Equation (8) with constraints given by Equation (9). Based on the above described unmixing, the unmixing unit 115 obtains an abundance of a cloud for all pixels in input image 110. The calculated abundance is also a measure of relative cloud thickness (g) for respective pixels. Unmixing unit 115 sends cloud thickness values (g) corresponding to pixels in input image 110 to calculation unit 117 and pixel correction unit 118.

Cloud transmittance database 116 includes information to obtain a cloud transmittance $T_{i,j}$ at a pixel (i,j), given a cloud spectrum $R_t$ and the cloud thickness $g_{i,j}$ at the pixel (i,j) for all L wavelength bands present in input image 110. In some embodiments, cloud transmittance database 116 includes a lookup table. In at least one embodiment, such a lookup table is generated from simulations of various clouds with different thicknesses by employing atmospheric modelling tools.

FIG. 2 is a diagram of a lookup table 200 as an example of cloud transmittance database 116, in accordance with some embodiments. Lookup table 200 includes a plurality of cloud types in column 232, a plurality of predetermined cloud spectra in column 234, a plurality of predetermined cloud thickness values in column 236, and a plurality of predetermined cloud transmittance values in column 238. A cloud spectrum indicates a cloud type. The Cloud No. in column 232 represents a type of cloud. Each type of cloud has a different spectrum. The Band No. in column 238 represents a kind of wavelength bands, for example, visible, near infrared, short wave infrared etc. For example, Band 1 is a Coastal Aerosol band with the wavelength range between 0.43-0.45 (μm), Band 2 is a Blue band with the wavelength range between 0.45-0.51 (μm). In some embodiments, the predetermined cloud spectra are included, but the cloud types (i.e., Cloud No. in FIG. 2) are omitted from lookup table 200.

Lookup table 200 stores cloud transmittance values for different types of clouds and various values of cloud thickness and wavelength band. More specifically, each cloud spectrum corresponds to one of the plurality of cloud types. For example, the first cloud type Cloud 1 in column 232 corresponds to the first cloud spectrum in column 234, the first cloud spectrum being an L×1 column vector having 7 reflectance values (L=7) each for one of the 7 wavelength bands (Band 1 to Band 7 in column 238) present in a multispectral image. For each cloud spectrum or cloud type, there is a plurality of corresponding cloud thickness values. For example, there are 5 cloud thickness values 0.2, 0.4, to 0.8 in column 236 and corresponding to the first cloud type Cloud 1 in column 232 and the first cloud spectrum in column 234. For each cloud spectrum and each cloud thickness value, there is a plurality of cloud transmittance values at the corresponding wavelength bands present in the multispectral image. For example, there are 7 cloud transmittance values 0.9955, 0.9968, 0.9983, 0.9992, 0.9998, 1.0000, and 1.0000 for 7 wavelength bands in column 238 and corresponding to the first cloud spectrum in column 234 and the first cloud thickness value 0.2 in column 236.

Returning to FIG. 1, calculation unit 117 receives cloud spectrum $R_t$ employed for unmixing from cloud spectrum extraction unit 114, and cloud thickness g from unmixing unit 115. Calculation unit 117 has access to cloud transmittance database 16, and looks (e.g., in column 234 of lookup table 200 in FIG. 2) for a predetermined spectrum that matches, or is closest to, cloud spectrum $R_t$ received from cloud spectrum extraction unit 114.

In at least one embodiment, when there is no exact matching among the predetermined spectra stored in cloud transmittance database 116, calculation unit 117 finds the closest predetermined spectrum in cloud transmittance database 116 based on the Euclidean distance.

Alternatively, in at least one embodiment, calculation unit 117 determines closeness of two spectra (i.e., the input cloud spectrum $R_t$ and each of the predetermined cloud spectra stored in cloud transmittance database 116) by calculating an angle between the two spectra (which are vectors as described herein). The smaller the angle between the two spectra, the closer the two spectra are. The predetermined cloud spectrum that has the smallest angle relative to the input cloud spectrum $R_t$ is returned as the closest predetermined spectrum.

When the predetermined spectrum matching or closest to cloud spectrum $R_t$ received from cloud spectrum extraction unit 114 is found, calculation unit 117 selects the corresponding cloud thickness values closest to cloud thickness g received from unmixing unit 115, and returns L corresponding cloud transmittance values. For example, when the predetermined spectrum matching or closest to cloud spectrum $R_t$ received from cloud spectrum extraction unit 114 is determined to be the first cloud spectrum in column 234 of lookup table 200, and cloud thickness g received from unmixing unit 115 is closest to 0.2, calculation unit 117 retrieves from cloud transmittance database 116 (lookup table 200) seven (L=7) corresponding cloud transmittance values 0.9955, 0.9968, 0.9983, 0.9992, 0.9998, 1.0000, and 1.0000 for corresponding wavelength bands Band 1 to Band 7, respectively.

Thus, for a pixel, based on the input cloud spectrum $R_t$ from cloud spectrum extraction unit 114 and cloud thickness g from unmixing unit 115, calculation unit 117 fetches L corresponding cloud transmittance values for the pixel from cloud transmittance database 116. In addition, calculation unit 117 calculates, for the same pixel, cloud reflectance values at L wavelength bands by employing Equation (3). Thus, for a pixel, calculation unit 117 provides two outputs, i.e., an L×1 column vector of cloud transmittance values ($T_{i,j}$) and an L×1 column vector of cloud reflectance values ($R_{i,j}$). Calculation unit 117 sends the calculated cloud transmittance and reflectance values to pixel correction unit 118.

Pixel correction unit 118 receives, for a pixel (i,j) of input image 110, cloud thickness value $g_{i,j}$ from unmixing unit 115, and cloud transmittance and reflectance vectors $T_{i,j}$ and $R_{i,j}$ from calculation unit 117. Firstly, pixel correction unit 118 separates pixels covered by thick clouds from pixels affected by thin clouds based on a result of comparison of a threshold and the cloud thickness values (g). In at least one embodiment, the threshold is set in advance by an operator. An example value of the threshold is 0.75. However, other values of the threshold are within the scopes of various embodiments.

When the cloud thickness $g_{i,j}$ at pixel (i,j) is less than the threshold, the pixel is assumed to be affected by no cloud or by a thin cloud, and pixel correction unit 118 corrects the pixel by applying the corresponding cloud reflectance and transmittance $R_{i,j}$ and $T_{i,j}$ in Equation (1) to obtained corrected radiance $s_{i,j}$ for the pixel. For clear pixels not affected by clouds, g is 0, and consequently cloud reflectance and transmittance $R_{i,j}$ and $T_{i,j}$ are 0 and 1, respectively. Therefore, radiance $s_{i,j}$ of clear pixels will remain unaffected by Equation (1) and will be the same as that captured by the one or more sensors of the satellite 1002. Pixel correction unit 118 generates a corrected image including the corrected pixels and clear pixels.

When the thickness of a cloud for a pixel is greater than or equal to the threshold, then the pixel is assumed to be affected by a thick cloud and pixel correction unit 118 masks the pixel as a thick cloud pixel, e.g., unusable for subsequent processing. A set of all thick cloud pixels in input image 110 is generated by pixel correction unit 118 as a cloud mask. In at least one embodiment, pixel correction unit 118 incorporates the cloud mask into the corrected image to obtain a processed image, then outputs the processed image. In at least one embodiment pixel correction unit 118 outputs the cloud mask as data separate from data of the corrected image.

Output unit 119 receives the corrected image and/or processed image from pixel correction unit 118. In at least one embodiment, output unit 119 receives the cloud mask as separate data from the corrected image, and overlays the cloud mask over the corrected image to obtain the processed image. In at least one embodiment, output unit 119 sends the corrected image and/or processed image to a display (not shown in FIG. 1). Alternatively or additionally, in at least one embodiment, output unit 119 saves the corrected image and/or processed image in a storage medium, such as a memory, for further distribution or processing, e.g., for cloud shadow detection and removal.

Figure 3:
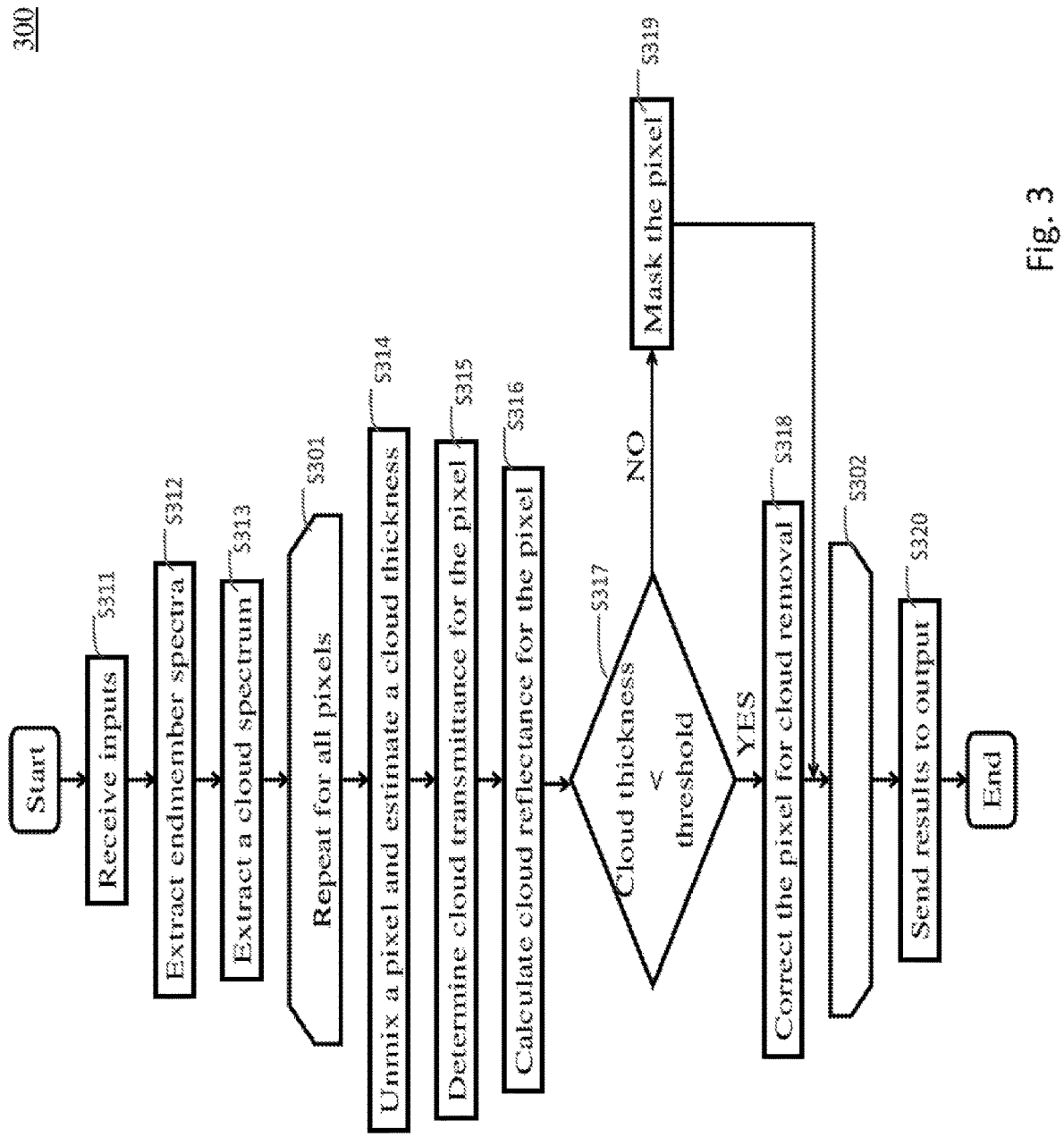
FIG. 3 is a flow chart of an image processing method, in accordance with some embodiments.

FIG. 3 is a flow chart of an image processing method 300, in accordance with some embodiments. In some embodiments, image processing method 300 is performed at least partially by at least one processor, e.g., in image processing system 100.

At operation S311, input data are received. The input data includes at least an input image. For example, in some embodiments, input unit 111 receives a multispectral cloudy image 110. In some embodiments, input data also includes a number of endmembers in the input image. For example, in some embodiments, receiving unit 112 receives from an operator the number (M) of endmembers other than a cloud in input image 110, as described with respect to FIG. 1.

At operation S312, endmember spectra are extracted from the input image. For example, in some embodiments, endmember extraction unit 113 extracts spectra of endmembers other than a cloud from input image 110, as described with respect to FIG. 1. The number (M) of the extracted spectra is equal to the number specified or received by receiving unit 112, as described with respect to FIG. 1.

At operation S313, a cloud spectrum of a cloud in the input image is extracted. For example, in some embodiments, cloud spectrum extraction unit 114 extracts a cloud spectrum $R_t$ from input image 110 by employing Equation (11), as described with respect to FIG. 1. Alternatively, in some embodiments, to identify pixels belonging to a cloud, cloud spectrum extraction unit 114 employs spectral tests specific for clouds and a thermal band as available.

As indicated between S301 and S302, operations S314 to S319 are repeated for all pixels in the input image.

At operation S314, each pixel is unmixed and a cloud thickness at the pixel is determined. For example, in some embodiments, unmixing unit 115 unmixes each pixel by using the set of endmember spectra from endmember extraction unit 113, and the cloud spectrum from cloud spectrum extraction unit 114, as described with respect to FIG. 1.

At operation S315, cloud transmittance for each pixel is retrieved, e.g., from a database. For example, in some embodiments, calculation unit 117 retrieves, for each pixel, cloud transmittance values in all wavelength bands of input image 110, by accessing cloud transmittance database 116, using the cloud spectrum and the cloud thickness as inputs, as described with respect to FIGS. 1 and 2.

At operation S316, cloud reflectance for each pixel is determined. For example, in some embodiments, calculation unit 117 applies the cloud spectrum $R_t(\lambda)$ and the cloud thickness $g_{i,j}$ in Equation (3) to calculate cloud reflectance $R_{i,j}(\lambda)$ for each pixel in each wavelength band of input image 110, as described with respect to FIG. 1.

At operation S317, it is determined whether the cloud thickness at each pixel is less than a threshold. For example, in some embodiments, pixel correction unit 118 performs this determination. If the cloud thickness is less than the threshold (Yes from S317), the pixel is correctable (no cloud or thin cloud) and the process proceeds to operation S318; otherwise (No from S317), the pixel is assumed to be a thick cloud pixel and the process proceeds to operation S319.

At operation S318, the pixel is assumed to be affected by no cloud or by a thin cloud, and correction of the pixel radiance is performed. For example, in some embodiments, pixel correction unit 118 corrects the radiance of the pixel by employing Equation (1), as described with respect to FIG. 1. If the cloud thickness at the pixel is zero (no cloud) then the pixel radiance is not affected by the correction using Equation (1), as also described with respect to FIG. 1. In contrast to other approaches that use the wavelength-independent cloud transmittance exemplified at Equation (4), pixel correction unit 118 in some embodiments employs a wavelength-dependent cloud transmittance, e.g., retrieved from cloud transmittance database 116, resulting in more accurate correction results.

At operation S319, the pixel is assumed to be affected by a thick cloud and masked as a thick cloud pixel. For example, in some embodiments, pixel correction unit 118 performs this masking and/or generates a cloud mask, as described with respect to FIG. 1.

At operation S320, the result in the form of one or more of a corrected image, a cloud mask and a processed image including both the corrected image and the cloud mask is output. For example, in some embodiments, output unit 119 sends a processed image including clear (no cloud) pixels, corrected thin-cloud pixels, and masked thick-cloud pixels to a memory and/or a display, for access by a user and/or other applications, as described with respect to FIG. 1.

The above method includes example operations, but they are not necessarily required to be performed in the order shown. For example, although operations S315-S316 for determining cloud transmittance and cloud reflectance are shown in FIG. 3 to be performed for all pixels regardless of whether the pixel can be corrected (thin cloud or no cloud) or not (thick cloud), other configurations are within the scopes of various embodiments. In an example configuration in accordance with some embodiments, operations S315-S316 for determining cloud transmittance and cloud reflectance are performed for pixels that can be corrected (thin cloud or no cloud) but not for thick cloud pixels. In this example configuration, operations S315-S316 are moved to be between Yes from operation S317 and operation S318. This example configuration reduces the processing load (calculation load) on the at least one processor performing image processing method 300 and/or reduces data access to cloud transmittance database 116 (e.g., lookup table 200), resulting in faster processing time without sacrificing the improved quality of the corrected or processed image. This is an improvement in the computer technology.

In some embodiments, an image processing device or method, such as image processing system 100 or image processing method 300, corrects pixels affected by thin clouds in an input image with improved accuracy. The reason is that pixel correction is performed, taking into account dependency of cloud transmittance on wavelength and cloud type. This is an improvement in the technology of image processing, especially digital image processing, over other approaches where an estimation of cloud transmittance does not consider wavelength and/or cloud type.

Specifically, as noted herein, other approaches use a linear model of cloud transmittance which is, in some situations, insufficiently accurate. In an aspect, a cloud affects shorter wavelengths more than longer wavelengths. This wavelength dependency of cloud optical properties is not reflected in a linear model used by other approaches. In contrast, an image processing system or method in accordance with some embodiments considers wavelength dependency of cloud optical properties, e.g., by retrieving various cloud transmittance values of a pixel across multiple wavelength bands. Accordingly, cloud removal in accordance with some embodiments is more accurate than other approaches.

In another aspect, different clouds differ in constituents and their proportion, and as a result, different clouds exhibit different optical properties. This cloud type dependency of cloud optical properties is not reflected in a linear model used by other approaches. In contrast, an image processing system or method in accordance with some embodiments considers cloud type dependency of cloud optical properties, e.g., by retrieving various cloud transmittance values of a pixel in accordance with a cloud spectrum representative of the cloud type detected in the input image. Accordingly, cloud removal in accordance with some embodiments is more accurate than other approaches.

Figure 4:
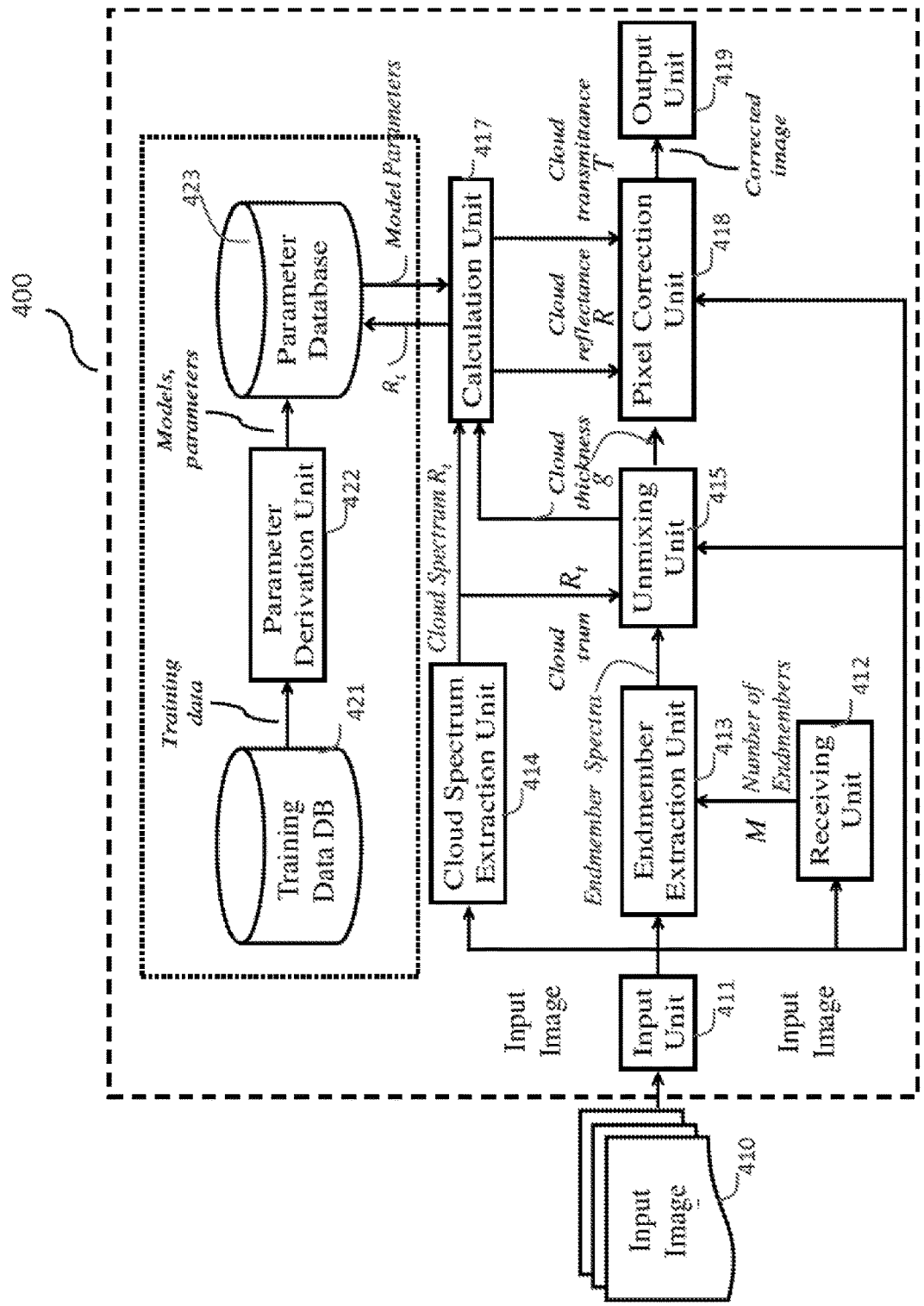
FIG. 4 is a block diagram of an image processing system, in accordance with some embodiments.

FIG. 4 is a block diagram of an image processing system 400, in accordance with some embodiments. In some embodiments, image processing system 400 differs from image processing system 100 in how values of a cloud optical property, such as cloud transmittance, are stored and/or retrieved. Specifically, while image processing system 100 stores cloud optical property values in a lookup table based on established atmospheric models, image processing system 400 derives and/or stores a model and corresponding model parameters for calculating cloud optical property values, by learning patterns of the cloud optical properties from real images and developing the model and corresponding model parameters, thereby giving more accurate estimates for cloud optical property values.

Image processing system 400 includes input unit 411, receiving unit 412, endmember extraction unit 413, cloud spectrum extraction unit 414, unmixing unit 415, calculation unit 417, pixel correction unit 418, output unit 419, training data database 421, parameter derivation unit 422, and parameter database 423. Input unit 411, receiving unit 412, endmember extraction unit 413, cloud spectrum extraction unit 414, unmixing unit 415, calculation unit 417, pixel correction unit 418 and output unit 419 correspond to input unit 111, receiving unit 112, endmember extraction unit 113, cloud spectrum extraction unit 114, unmixing unit 115, calculation unit 117, pixel correction unit 118 and output unit 119, respectively, of image processing system 100. Detailed descriptions of input unit 411, receiving unit 412, endmember extraction unit 413, cloud spectrum extraction unit 414, unmixing unit 415, pixel correction unit 418 and output unit 419 are omitted, unless otherwise provided herein. Each of training data database 421 and 423 is stored in at least one storage device, for example, as described with respect to cloud transmittance database 116 in FIG. 1. Parameter derivation unit 422 is implemented by at least one processor, for example, as described with respect to image processing system 100 in FIG. 1. In some embodiments, training data database 421, parameter derivation unit 422 and parameter database 423 are included in the same computer system, or at different computer systems distributed, and coupled to each other, over a network. In some embodiments, one or more of training data database 421, parameter derivation unit 422 and parameter database 423 is/are included in the same computer system as one or more of the other units of image processing system 400.

Training data database 421, parameter derivation unit 422, parameter database 423 and calculation unit 417 are described in detail herein.

In some embodiments, training data database 421 stores training data, i.e., information about various clouds and corresponding optical properties, such as transmittance, reflectance, and absorptance. The training data have different kinds as described herein. For example, training data database 421 includes, for each geographical area, at least one pair of images captured in cloudy and clear conditions, respectively. In at least one embodiment, the pairs of images are captured over areas covering different geographical structures and locations. Training data database 421 further includes cloud properties of the clouds in the images captured in cloudy conditions, e.g., cloud transmittance and cloud reflectance values corresponding to various types of clouds, different cloud thickness, and wavelength bands. In at least one embodiment, these cloud properties are provided by external sources, such as another satellite and/or multispectral image processing system covering the same geographical area. The training data stored in training data database 421 is available to parameter derivation unit 422.

Parameter derivation unit 422 receives training data from the training data database 421 and tunes or learns patterns in the training data. From the received training data, parameter derivation unit 422 tunes or learns a model and/or corresponding model parameters to derive cloud optical property, e.g., claim transmittance and/or cloud reflectance. Exemplary models tuned or learned by parameter derivation unit 422 in accordance with some embodiments are described below.

An example model includes a mathematical function and corresponding model parameters to calculate the cloud transmittance given a cloud spectrum, cloud thickness, and wavelength. In some embodiments, an operator provides the function (i.e., model) and initial values of corresponding model parameters. When the function is known, the corresponding model parameters are tuned by performing a regression analysis on the training data. An example regression analysis is described at http://www.fao.org/docrep/006/X8498E/x8498e0e.htm, which is incorporated by reference herein.

An example function, Equation (12), to derive cloud transmittance $T_{i,j}(\lambda)$ for wavelength band A given a cloud spectrum $R_t$ and cloud thickness $g_{i,j}$ is as follows:

$$T_{i,j}(\lambda) = 1 - \left(\frac{R_t(\lambda)}{|R_t|}\right)^x \times g_{i,j} \times e^{-\frac{\lambda^y(1-g_{i,j})}{K}}, \quad (12)$$

$$R_{i,j}(\lambda) = g_{i,j} \times R_t(\lambda), \quad (3)$$

where $R_t(\lambda)$ is cloud reflectance for wavelength band $\lambda$, $|R_t|$ is a magnitude of the cloud spectrum vector $R_t$, and K, x, y are model parameters. Cloud reflectance $R_{i,j}(\lambda)$ is determined using Equation (3).

Another example function, Equation (13), to derive cloud transmittance $T_{i,j}(\lambda)$ for wavelength band A given a cloud spectrum $R_t$ is as follows:

$$T_{i,j}(\lambda) = \Sigma_{k=0}^{N} a_{k,\lambda} \cdot R_t(\lambda)^k, \quad (13)$$

$$R_{i,j}(\lambda) = g_{i,j} \times R_t(\lambda) \quad (3)$$

where N is the degree of the polynomial, and $a_{k,\lambda}$ are constant coefficients for wavelength band $\lambda$ and for the integer k from 0 to N. Cloud reflectance $R_{i,j}(\Delta)$ is determined using Equation (3).

In some embodiments, a model is not yet known or not entered by an operator. In this situation, a non-linear model and corresponding model parameters are learned by parameter derivation unit 422, based on a neural network, using training data from training data database 421, to output cloud transmittance values in multiple wavelength bands of an input image when inputs are a cloud spectrum and a corresponding cloud thickness. An example learning technique based on a neural network is described in Richards, J. A. and Richards, J. A., 1999. Remote sensing digital image analysis (Vol. 3). Berlin et al.: Springer, which is incorporated by reference herein.

Parameter derivation unit 422 stores the model with tuned (or learned) model parameters in parameter database 423. In some embodiments, parameter database 423 is similar to lookup table 200 in that parameter database 423 also includes a plurality of cloud types with a plurality of corresponding cloud spectra. However, cloud thickness values are omitted from parameter database 423. Further, for each cloud spectrum, instead of a set of cloud transmittance values in multiple wavelength bands as in lookup table 200, parameter database 423 includes a model and corresponding model parameters for calculating values of a cloud optical property in the multiple wavelength bands. In at least one embodiment, different cloud types (i.e., different cloud spectra) in parameter database 423 are associated with the same model, but with different sets of model parameters. In at least one embodiment, different cloud types (i.e., different cloud spectra) in parameter database 423 are associated with different models. The models and model parameters stored in parameter database 423 are available to calculation unit 417. In at least one embodiment, the predetermined cloud spectra are included, but the cloud types (e.g., Cloud No. as in FIG. 2) are omitted from parameter database 423.

Calculation unit 417 receives cloud spectrum $R_t$ extracted by cloud spectrum extraction unit 414 from input image 410, and cloud thickness g from unmixing unit 414. In some embodiments, calculation unit 417 retrieves a model, together with model parameters, corresponding to the input cloud spectrum $R_t$ from parameter database 423. In some embodiments, one or more models are already provided at calculation unit 417 which retrieves model parameters for such model(s) from parameter database 423 using the extracted cloud spectrum $R_t$ as an input. Further, calculation unit 417 applies variables such as cloud thickness, wavelength, cloud spectrum to the model and derives values of cloud transmittance and/or cloud reflectance for each pixel and wavelength band, for example, by using Equation (12) and Equation (3), or by using Equation (13) and Equation (3). Thus, calculation unit 417 provides two outputs: cloud transmittance and cloud reflectance. Calculation unit 417 sends the calculated cloud transmittance and cloud reflectance values to pixel correction unit 418. Pixel correction unit 418 corrects and/or masks pixels in the input image 410 similarly to pixel correction unit 118.

Figure 5:
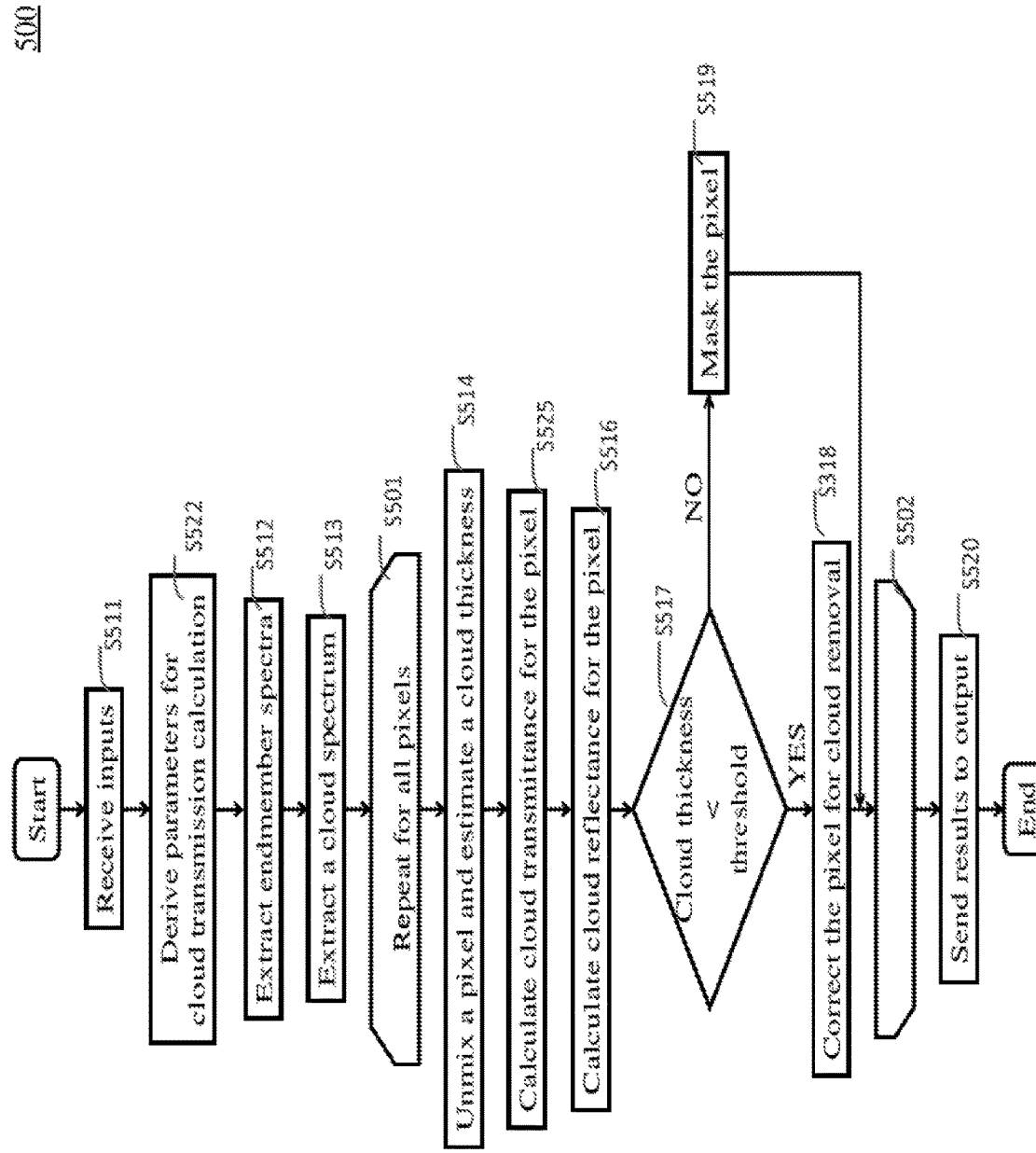
FIG. 5 is a flow chart of an image processing method, in accordance with some embodiments.

FIG. 5 is a flow chart of an image processing method 500, in accordance with some embodiments. In some embodiments, image processing method 500 is performed at least partially by at least one processor, e.g., in image processing system 400. Operations S501-S502, S511-S514 and S516-S520 correspond to operations S301-302, S311-S314 and S316-S320, respectively, and detailed descriptions of operations S501-S502, S511-S514 and S516-S520 are omitted, unless otherwise provided herein. In some embodiments, image processing method 500 differs from image processing method 300 in at least operations S522 and S525.

Specifically, after receiving input at operation S511, the process proceeds to operation S522 where model parameters for calculating values of a cloud optical property are derived. For example, in some embodiments, parameter derivation unit 422 tunes model parameters for an already provided model, e.g., Equation (12) or Equation (13), using the data in training data database 421. For another example, in some embodiments where a model is not yet provided, parameter derivation unit 422 learns a model and corresponding model parameters for such a model, by using training data available in training data database 421.

More specifically, when training data database 421 includes a pair of cloudy and clear images for each geographic area, parameter derivation unit 422 first detects regions of the area affected by clouds. In some embodiments, this detection is done based on spatial and/or spectral properties of clouds. For examples, pixels affected by clouds have higher reflectance and lower temperature than other pixels not affected by clouds.

Next, parameter derivation unit 421 derives cloud thickness for all pixels affected by clouds in the cloudy image. In some embodiments, the cloud thickness is derived using the same or similar unmixing technique as described with respect to unmixing unit 115.

Further, parameter derivation unit 421 employs the corresponding clear image and calculates cloud transmittance and cloud reflectance values for each pixel in the cloudy image, so as to make the pixel in the cloudy image clear (by removing effects of clouds). Parameter derivation unit 421 employs corresponding values of cloud thickness, cloud transmittance and cloud reflectance to tune model parameters for an already provided model, such as Equation (12) or Equation (13), using, for example, a regression analysis. In some situations where the model, e.g., Equation (12) or Equation (13), is already provided, there is a possibility that the provided model may not able to find or fit all patterns of training data in training data database 421. For such situations, parameter derivation unit 422 employs a neural network to learn both the model as well as corresponding model parameters. Parameter derivation unit 422 then stores the model and tuned or learned model parameters in parameter database 423 and this information is made available to calculation unit 417.

At operation S525, unlike operation S315 in image processing method 300 where values of cloud transmittance for each pixel are retrieved from a database, values of cloud transmittance for each pixel are calculated by calculation unit 417. Specifically, calculation unit 417 uses cloud spectrum $R_t$ as an input to access parameter database 423 and retrieves model parameters corresponding to the input cloud spectrum. In some embodiments, when a model is already provided at calculation unit 417, such a model is not retrieved from parameter database 423; otherwise, calculation unit 417 retrieves a model along with corresponding model parameters from parameter database 423. Calculation unit 417 then uses the model and the retrieved model parameters to calculate the cloud transmittance values for each pixel, as described with respect to FIG. 4. Calculation unit 417 also uses an already provided function, e.g., Equation (3), to calculate the cloud reflectance values for each pixel. The calculated cloud transmittance and cloud reflectance values are provided to pixel correction unit 418. Other operations of image processing method 500 are similar to corresponding operations of image processing method 300.

In some embodiments, parameter derivation unit 422 derives a model and/or model parameters for cloud reflectance, and stores the derived model and/or model parameters in parameter database 423. Calculation unit 417 then retrieves the stored model and/or model parameters from parameter database 423, and calculates cloud reflectance values using the retrieved model and/or model parameters, instead of Equation (3). Other configurations are within the scopes of various embodiments.

One or more advantages and/or effects described with respect to image processing system 100 and/or image processing method 300 is/are achievable by image processing system 400 and/or image processing method 500.

Further, in some embodiments, image processing device 400 and/or image processing method 500 derives cloud transmittance and/or cloud reflectance by using, e.g., tuning or learning a model in, the training data. This configuration makes it possible in one or more embodiments to learn complex relations among cloud type, cloud thickness, wavelength and one or more cloud optical properties, which, in some situations, are less likely explorable with a lookup table approach. As a result, cloud transmittance and/or cloud reflectance are estimated more accurately. Consequently, pixels affected by clouds are corrected more accurately, further improving the technology of image processing, especially digital image processing.

Figure 6:
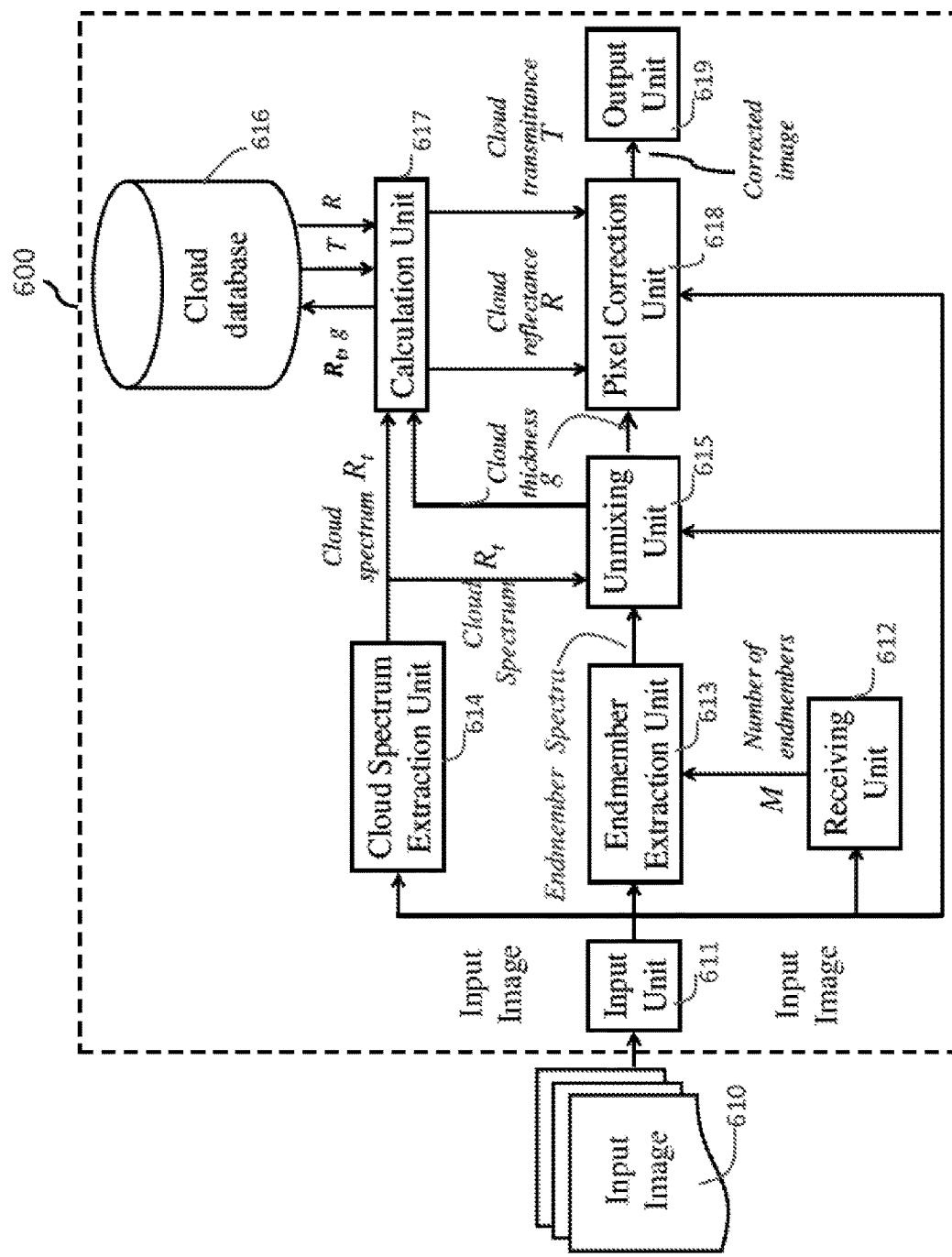
FIG. 6 is a block diagram of an image processing system, in accordance with some embodiments.

FIG. 6 is a block diagram of an image processing system 600, in accordance with some embodiments. In some embodiments, image processing system 600 differs from image processing system 100 in a cloud database in which not only cloud transmittance values, but also cloud reflectance values across multiple wavelength bands, are previously stored for associated cloud spectra and cloud thickness values. As a result, cloud reflectance values are determined not by a fixed equation such as Equation (3), but by predetermined data that better reflect various practical scenarios with more complex dependency of cloud reflectance from cloud thickness values. Thus, accuracy of cloud removal is improved.

Image processing system 600 includes input unit 611, receiving unit 612, endmember extraction unit 613, cloud spectrum extraction unit 614, unmixing unit 615, cloud database 616, calculation unit 617, pixel correction unit 618, and output unit 619. Input unit 611, receiving unit 612, endmember extraction unit 613, cloud spectrum extraction unit 614, unmixing unit 615, cloud database 616, calculation unit 617, pixel correction unit 618 and output unit 619 correspond to input unit 111, receiving unit 112, endmember extraction unit 113, cloud spectrum extraction unit 114, unmixing unit 115, cloud transmittance database 116, calculation unit 117, pixel correction unit 118 and output unit 119, respectively, of image processing system 100. Detailed descriptions of input unit 611, receiving unit 612, endmember extraction unit 613, cloud spectrum extraction unit 614, unmixing unit 615, pixel correction unit 618 and output unit 619 are omitted, unless otherwise provided herein.

Cloud database 616 and calculation unit 617 are described in detail herein.

Cloud database 616 has a similar structure to cloud transmittance database 116 in image processing system 100. A difference is, in addition to cloud transmittance values as in cloud transmittance database 116, cloud reflectance values are also stored in cloud database 616.

Figure 7:
FIG. 7 is a diagram of a table in a database, in accordance with some embodiments.

FIG. 7 is a diagram of a lookup table 700 as an example of cloud database 616, in accordance with some embodiments. Lookup table 700 includes a plurality of cloud types in column 732, a plurality of predetermined cloud spectra in column 734, a plurality of predetermined cloud thickness values in column 736, a plurality of predetermined cloud transmittance values in column 738, and a plurality of predetermined cloud reflectance values in column 739. The arrangement of data in columns 732, 734, 736, 738 is similar to that in columns 232, 234, 236, 238, respectively, of lookup table 200. Detailed descriptions of data in columns 732, 734, 736, 738 are omitted. Data in column 739 are arranged similar to column 738, with a difference in that data in column 739 are cloud reflectance values as opposed to cloud transmittance values in column 738. For each cloud spectrum and each cloud thickness value, there is a plurality of cloud transmittance values and also a plurality of cloud reflectance values at the corresponding wavelength bands. These cloud transmittance values and cloud reflectance values stored in cloud database 616 are available to calculation unit 617.

Returning to FIG. 6, calculation unit 617 retrieves cloud transmittance and cloud reflectance values across multiple wavelength bands of input image 610 from cloud database 616 by using, as inputs, cloud spectrum $R_t$ extracted by cloud spectrum extraction unit 614 and cloud thickness g determined by unmixing unit 615. Thus, calculation unit 617 provides two outputs: cloud transmittance and cloud reflectance. Calculation unit 617 sends the retrieved cloud transmittance and cloud reflectance values to pixel correction unit 618 which corrects and/or masks pixels in the input image 610 similarly to pixel correction unit 118.

Figure 8:
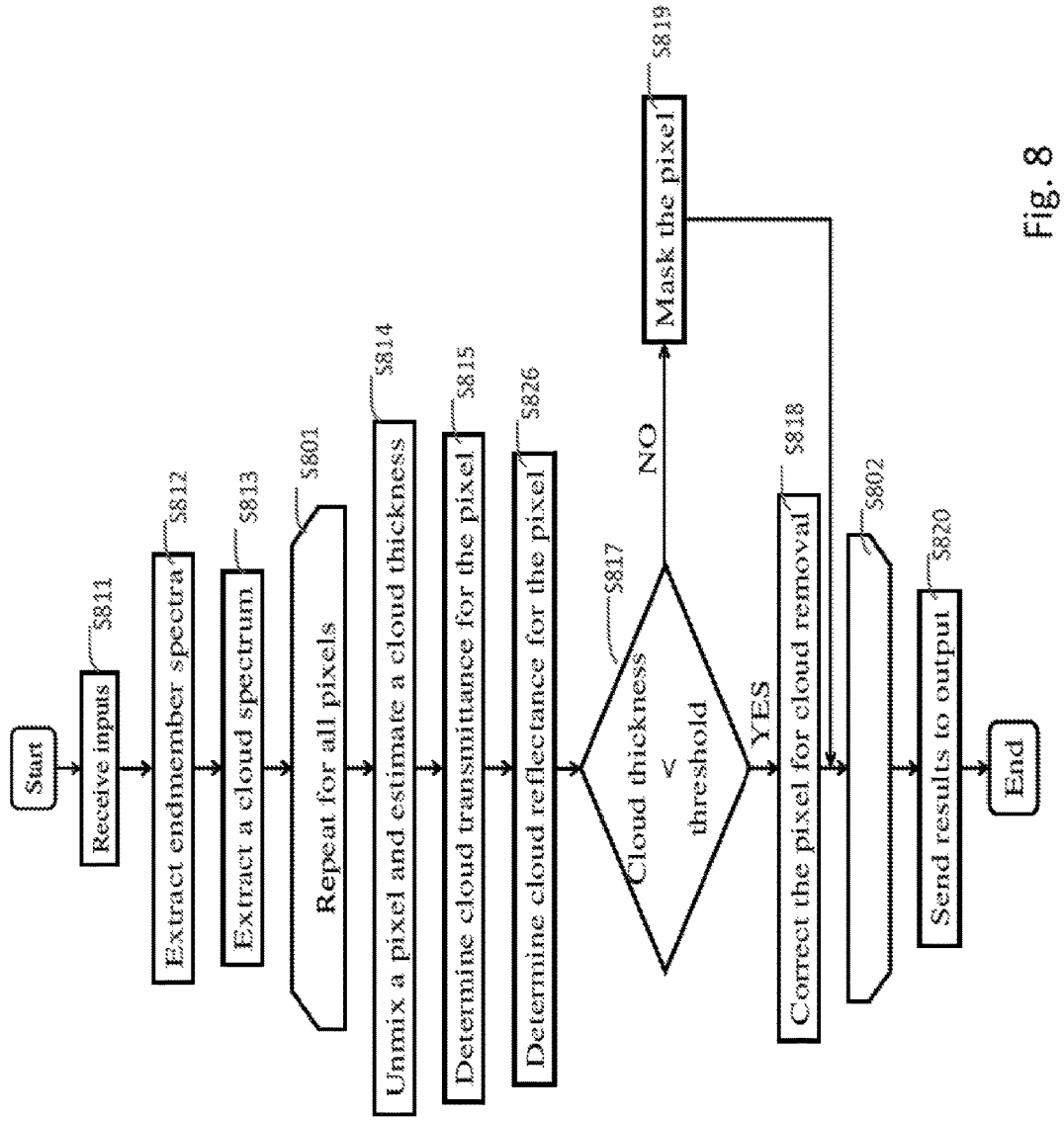
FIG. 8 is a flow chart of an image processing method, in accordance with some embodiments.

FIG. 8 is a flow chart of an image processing method 800, in accordance with some embodiments. In some embodiments, image processing method 800 is performed at least partially by at least one processor, e.g., in image processing system 600. Operations S801-S802, S811-S815 and S817-S820 correspond to operations S301-S302, S311-S315 and S317-S320, respectively, and detailed descriptions of operations S801-S802, S811-S815 and S817-S820 are omitted, unless otherwise provided herein. In some embodiments, image processing method 800 differs from image processing method 300 in at least operation S826.

At operation S826, cloud reflectance for each pixel is retrieved, e.g., from a database. For example, in some embodiments, calculation unit 617 retrieves, for each pixel, cloud reflectance values in all wavelength bands of input image 610, by accessing cloud database 616, using the cloud spectrum and the cloud thickness as inputs, as described with respect to FIGS. 6 and 7. In at least one embodiment, cloud reflectance at operation S826 and cloud transmittance at operation S815 are retrieved together. Other operations of image processing method 800 are similar to corresponding operations of image processing method 300.

One or more advantages and/or effects described with respect to image processing system 100 and/or image processing method 300 and/or image processing system 400 and/or image processing method 500 is/are achievable by image processing system 600 and/or image processing method 800.

Further, in some embodiments, image processing device 600 and/or image processing method 800 makes it possible to improve cloud removal accuracy. Specifically, when cloud reflectance values are calculated according to a fixed equation, e.g., a linear function of cloud thickness, such approach in some situations may not be sufficient to accurately reflect complex dependency of cloud reflectance on cloud thickness, as it gives an approximate measure of the actual cloud reflectance values. Image processing device 600 and/or image processing method 800 in some embodiments retrieve more accurate cloud reflectance values from a cloud database with data created, in at least one embodiment, by an expert and/or more complex non-linear models. Consequently, pixels affected by clouds are corrected more accurately, further improving the technology of image processing, especially digital image processing.

Figure 9:
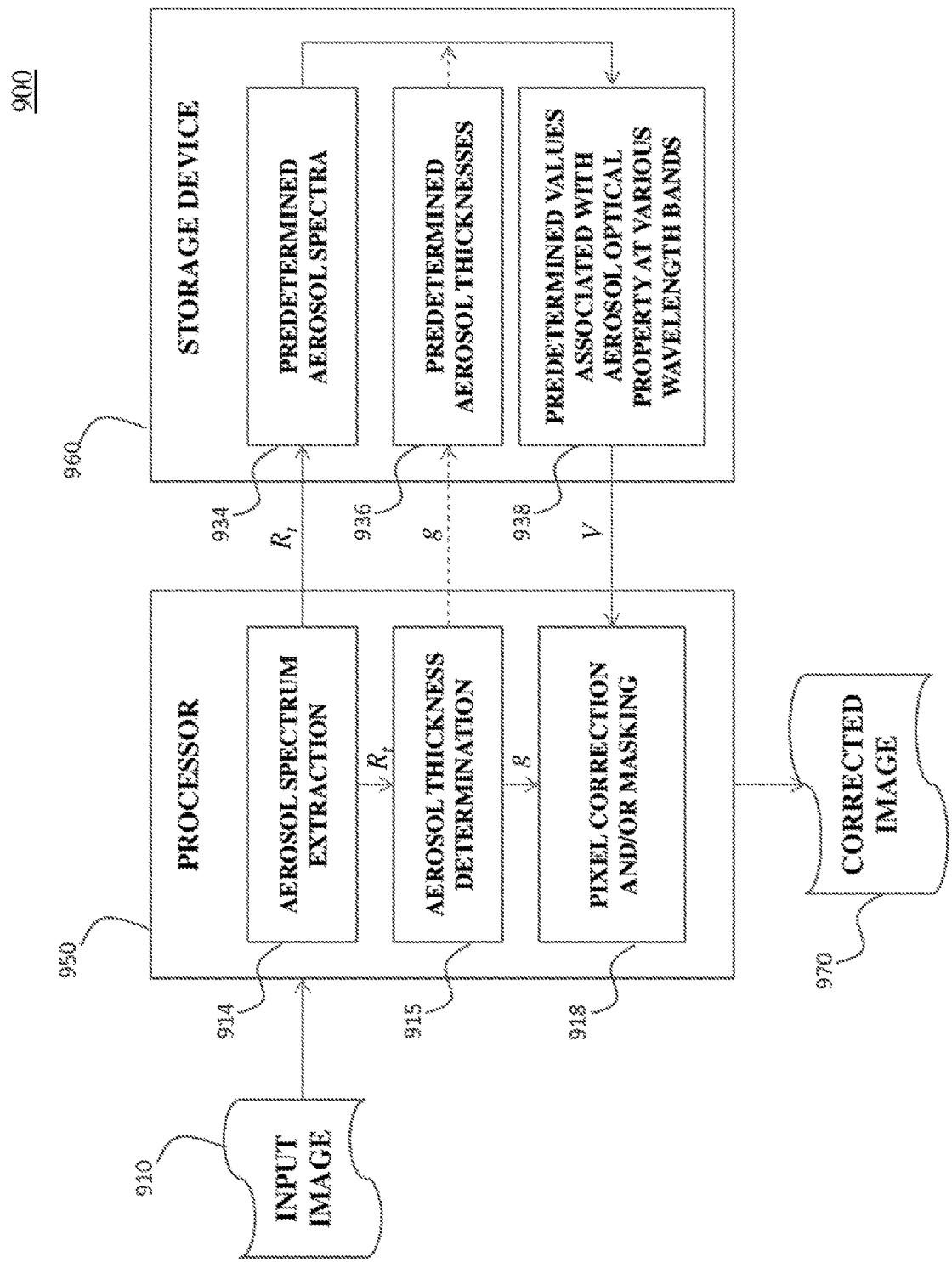
FIG. 9 is a block diagram of an image processing system, in accordance with some embodiments.

FIG. 9 is a block diagram of an image processing system 900, in accordance with some embodiments. Image processing system 900 includes at least one processor 950 and at least one storage device 960. Processor 950 is coupled to storage device 960, e.g., by a bus in a computer system or over a network, as described with respect to FIG. 11. In some embodiments, processor 950 and/or storage device 960 correspond to the at least one processor and/or the at least one storage device, respectively, of one or more of image processing system(s) 100 (FIG. 1), 400 (FIG. 4) and/or 600 (FIG. 6).

In some embodiments, processor 950 is configured to extract, from an input image, an aerosol spectrum across a plurality of wavelength bands of the input image. For example, processor 950 receives input image 910 and is configured to perform cloud spectrum extraction 914 to extract, from input image 910, an aerosol spectrum, e.g., $R_t$, across a plurality of wavelength bands of input image 910. In at least one embodiment, cloud spectrum extraction 914 is performed in a manner described with respect to cloud spectrum extraction unit 114 (FIG. 1) and/or operation S313 (FIG. 3).

In some embodiments, storage device 960 contains therein a database storing a plurality of predetermined aerosol spectra, and a plurality of corresponding values associated with at least one aerosol optical property at the plurality of wavelength bands. For example, storage device 960 contains therein one or more of cloud transmittance database 116 (FIG. 1), parameter database 423 (FIG. 4), and cloud database 616 (FIG. 6). The database stored in storage device 960 stores a plurality of predetermined aerosol spectra 934 and a plurality of corresponding predetermined values 938 associated with at least one aerosol optical property, e.g., transmittance and/or reflectance. In at least one embodiment, predetermined aerosol spectra 934 correspond to spectra at column 234 (FIG. 2). In at least one embodiment, predetermined values 938 associated with at least one aerosol optical property correspond to transmittance values at column 238 (FIG. 2) or column 738 (FIG. 7), reflectance values at column 739 (FIG. 7), or model parameters in parameter database 423 (FIG. 4) for calculating transmittance and/or reflectance values.

In some embodiments, processor 950 is further configured to retrieve, from the database, values associated with the at least one aerosol optical property at the plurality of wavelength bands and corresponding to the extracted aerosol spectrum. For example, processor 950 is configure to use extracted aerosol spectrum $R_t$ as an input to the database stored in storage device 960, locate a matching or closest spectrum among predetermined aerosol spectra 934, and retrieve corresponding value V among the predetermined values 938. In at least one embodiment, this retrieving operation of processor 950 is performed in a manner described with respect to one or more of calculation unit(s) 117 (FIG. 1), 417 (FIG. 4) and/or 617 (FIG. 6), and/or operation(s) S315 (FIG. 3), S525 (FIG. 5), S815 (FIG. 8) and/or S826 (FIG. 8).

In some embodiments, processor 950 is further configured to correct the input image, by using the retrieved values associated with the at least one aerosol optical property at the plurality of wavelength bands, to generate a corrected image. For example, processor 950 is configured to perform pixel correction and/or masking 918 in a manner described with respect to one or more of pixel correction unit 118 (FIG. 1) and/or operations S317-S319 (FIG. 3). As a result, corrected image 960 after could removal is generated.

In some embodiments, processor 950 is further configured to determine an aerosol thickness at each pixel of a plurality of pixels in the input image. For example, processor 950 is further configured to perform cloud thickness determination 915 to determine an aerosol thickness g at each pixel of input image 910 in a manner described with respect to one or more of unmixing unit 115 (FIG. 1) and/or operation S314 (FIG. 3).

In some embodiments, processor 950 is further configured to retrieve value V using both extracted aerosol spectrum $R_t$ and determined aerosol thickness g, in a manner described with respect to one or more of calculation unit(s) 117 (FIG. 1) and/or 617 (FIG. 6), and/or operation(s) S315 (FIG. 3), S815 (FIG. 8) and/or S826 (FIG. 8).

In some embodiments, processor 950 is further configured to retrieve value V using extracted aerosol spectrum $R_t$, but without using determined aerosol thickness g, in a manner described with respect to one or more of calculation unit 417 (FIG. 4) and/or operation S525 (FIG. 5).

In some embodiments, processor 950 is further configured to correct the input image, by using the retrieved values, the determined aerosol thickness, and the extracted aerosol spectrum, for example, in a manner described with respect to one or more of pixel correction unit 118 (FIG. 1) and/or operations S317-S319 (FIG. 3).

One or more advantages and/or effects described with respect to one or more of image processing system(s) 100, 400 and/or 600, and/or image processing method(s) 300, 500 and/or 800 is/are achievable by image processing system 900.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 11:
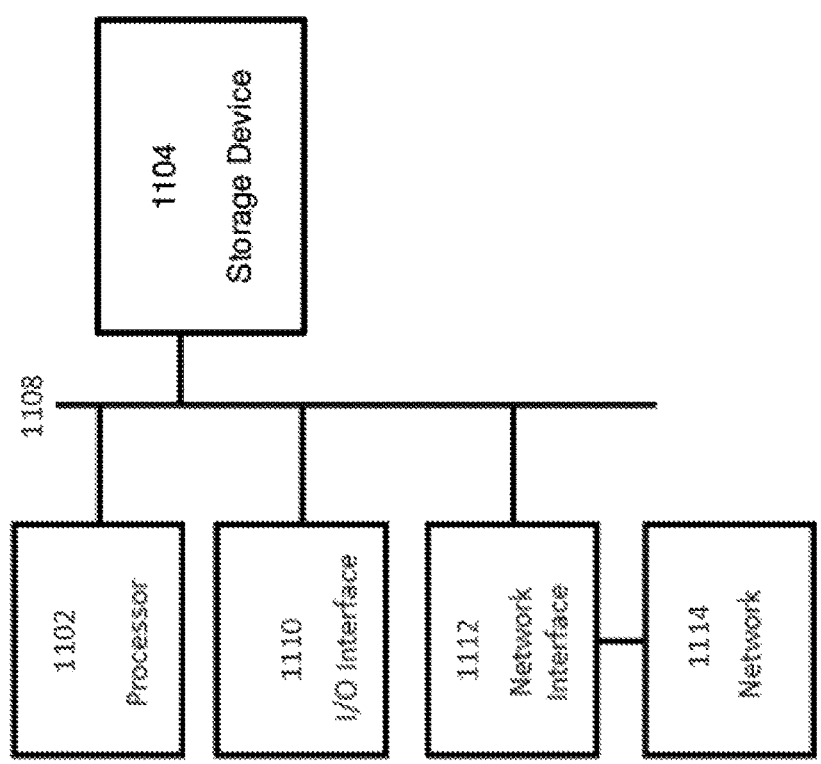
FIG. 11 is a block diagram of a computer system, in accordance with some embodiments.

FIG. 11 is a block diagram of a computer system 1100 in accordance with some embodiments. One or more of the units and/or systems and/or operations described with respect to FIGS. 1-10 is/are realized in some embodiments by one or more computer systems 1100 of FIG. 11. Computer system 1100 comprises hardware processor 1102, storage device 1104 including at least one non-transitory, computer readable storage medium, bus 1108, I/O (input/output) interface 1110, and network interface 1112. Processor 1102 is coupled with storage device 1104, I/O interface 1110, and network interface 1112 via bus 1108. Network interface 1112 is connectable to network 1114, so that processor 1102 and storage device 1104 are communicable with external devices via network 1114. Processor 1102 is configured to execute computer program instructions encoded in storage device 1104 and/or to access data stored in storage device 1104 to cause computer system 1100 to perform one or more functionalities and/or operations described with respect to FIGS. 1-10.

In some embodiments, processor 1102 includes one or more of a central processing unit (CPU), a multi-processor, a distributed processing system, an application specific integrated circuit (ASIC), and/or a suitable hardware processing unit.

In some embodiments, storage device 1104 includes one or more of an electronic, magnetic, optical, electromagnetic, infrared, and/or a semiconductor system (or apparatus or device) for storing instructions and/or data in a non-transitory manner. For example, storage device 1104 includes a semiconductor or solid-state memory, a magnetic tape, a removable computer diskette, a random access memory (RAM), a read-only memory (ROM), a rigid magnetic disk, and/or an optical disk. In some embodiments using optical disks, storage device 1104 includes a compact disk-read only memory (CD-ROM), a compact disk-read/write (CD-R/W), and/or a digital video disc (DVD).

In some embodiments, I/O interface 1110 is connectable with external circuitry. In some embodiments, I/O interface 1110 includes one or more of a keyboard, keypad, mouse, trackball, trackpad, cursor direction keys, card reader, communication port, display, signal light, printer and/or audio device for communicating information to/from processor 1102.

In some embodiments, network interface 1112 allows computer system 1100 to communicate with network 1114, to which one or more other computer systems and/or image capturing/processing equipment are connected. In some embodiments, network interface 1112 includes one or more of wireless network interfaces such as BLUETOOTH, WIFI, WIMAX, GPRS, or WCDMA; or wired network interface such as ETHERNET, USB, or IEEE-1394.

By being configured to execute some or all of functionalities and/or operations described with respect to FIGS. 1-10, computer system 1100 enables the realization of one or more advantages and/or effects described with respect to FIGS. 1-10.

Some embodiments of the instant application are applicable as a preprocessing tool for compensating for environmental effects due to aerosols, e.g., clouds, in multispectral images, such as satellite and/or aerial images, before advance level multispectral image processing operations.

In some embodiments, an image processing system comprises at least one storage device, and at least one processor coupled to the storage device and configured to extract, from an input image, an aerosol spectrum across a plurality of wavelength bands of the input image. The at least one storage device contains therein a database storing a plurality of predetermined aerosol spectra, and a plurality of corresponding values associated with at least one aerosol optical property at the plurality of wavelength bands. The at least one processor is further configured to retrieve, from the database, values associated with the at least one aerosol optical property at the plurality of wavelength bands, the retrieved values corresponding to the extracted aerosol spectrum. The at least one processor is further configured to correct the input image, by using the retrieved values associated with the at least one aerosol optical property at the plurality of wavelength bands, to generate a corrected image.

In some embodiments, an image processing method is performed at least partially by at least one processor. In the image processing method, a cloud spectrum across a plurality of wavelength bands of an input image is extracted from the input image. A cloud thickness at each pixel of a plurality of pixels in the input image is determined. A database contained in at least one storage device is accessed. The database stores a plurality of predetermined values of the cloud thickness and predetermined cloud spectra, and a plurality of corresponding values of at least one cloud optical property. From the database, values of the at least one cloud optical property at the plurality of wavelength bands are retrieved. The retrieved values correspond to the extracted cloud spectrum and the determined cloud thickness. The input image is corrected by using the retrieved values of the at least one cloud optical property at the plurality of wavelength bands, to remove clouds from the input image to obtain a corrected image.

In some embodiments, a non-transitory, computer-readable medium comprises therein instructions which, when executed by at least one processor, cause the at least one processor to perform the following operations. A cloud spectrum across a plurality of wavelength bands of an input image is extracted from the input image. A cloud thickness at each pixel of a plurality of pixels in the input image is determined. A parameter database contained in at least one storage device is accessed. The parameter database stores a plurality of predetermined cloud spectra, and a plurality of corresponding parameters of at least one model of cloud transmittance. From the parameter database, parameters of the at least one model of the cloud transmittance at the plurality of wavelength bands are retrieved. The retrieved parameters correspond to the extracted cloud spectrum. Values of the cloud transmittance at the plurality of wavelength bands are determined by applying (i) the parameters retrieved from the parameter database, and (ii) the extracted cloud spectrum to the at least one model. Values of the cloud reflectance are determined based on the determined cloud thickness and the extracted cloud spectrum. The input image is corrected by using the determined values of the cloud transmittance and the cloud reflectance, to remove clouds from the input image to obtain a corrected image.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image processing system, comprising:
   at least one storage device; and
   at least one processor coupled to the at least one storage device and configured to extract, from an input image, an aerosol spectrum across a plurality of wavelength bands of the input image,
   wherein the at least one storage device contains therein a database for storing
      a plurality of predetermined aerosol spectra, and
      a plurality of corresponding values associated with at least one aerosol optical property at the plurality of wavelength bands, and
   wherein the at least one processor is further configured to
      retrieve, from the database, values associated with the at least one aerosol optical property at the plurality of wavelength bands, the retrieved values corresponding to the extracted aerosol spectrum, and
      correct the input image, by using the retrieved values associated with the at least one aerosol optical property at the plurality of wavelength bands, to generate a corrected image.

2. The image processing system of claim 1, wherein the at least one processor is further configured to determine an aerosol thickness at each pixel of a plurality of pixels in the input image.

3. The image processing system of claim 2, wherein the at least one processor is further configured to correct the input image, by using the retrieved values, the determined aerosol thickness, and the extracted aerosol spectrum.

4. The image processing system of claim 2, wherein the plurality of values associated with the at least one aerosol optical property stored in the database includes values of the at least one aerosol optical property, and the retrieved values of the at least one aerosol optical property correspond to the extracted aerosol spectrum and the determined aerosol thickness.

5. The image processing system of claim 2, wherein the plurality of values associated with the at least one aerosol optical property stored in the database includes parameters of at least one model of the at least one aerosol optical property, and the at least one processor is further configured to calculate the at least one aerosol optical property at the plurality of wavelength bands by applying (i) the parameters retrieved from the database, and (ii) the determined cloud thickness to the at least one model.

6. The image processing system of claim 2, wherein the at least one processor is further configured to
   extract a set of spectra of one or more endmembers from the input image, and
   determine, from the extracted set of spectra and the extracted aerosol spectrum, the aerosol thickness at each pixel of the plurality of pixels in the input image.

7. The image processing system of claim 2, wherein the at least one processor is further configured to
   compare the determined aerosol thickness at each pixel of the plurality of pixels with a predetermined threshold,
   generate an aerosol mask including pixels where the determined aerosol thickness is not lower than the predetermined threshold,
   overlay the generated aerosol mask over the corrected image to obtain a processed image, and
   output the processed image.

8. An image processing method performed at least partially by at least one processor, the image processing method comprising:

extracting, from an input image, a cloud spectrum across a plurality of wavelength bands of the input image;

determining a cloud thickness at each pixel of a plurality of pixels in the input image;

accessing a database contained in at least one storage device and storing
- a plurality of predetermined values of the cloud thickness and predetermined cloud spectra, and
- a plurality of corresponding values of at least one cloud optical property;

retrieving, from the database, values of the at least one cloud optical property at the plurality of wavelength bands, the retrieved values corresponding to the extracted cloud spectrum and the determined cloud thickness; and correcting the input image, by using the retrieved values of the at least one cloud optical property at the plurality of wavelength bands, to remove clouds from the input image to obtain a corrected image.

9. The image processing method of claim 8, wherein the at least one cloud optical property having the plurality of values stored in the database includes one of cloud reflectance and cloud transmittance, the method further comprises determining values of the other of the cloud reflectance and the cloud transmittance based on the determined cloud thickness, and said correcting the input image is performed by using the determined or retrieved values of the cloud reflectance and the cloud transmittance.

10. The image processing method of claim 8, wherein the at least one cloud optical property having the plurality of values stored in the database includes cloud reflectance and cloud transmittance, said correcting the input image is performed by using the retrieved values of the cloud reflectance and the cloud transmittance.

11. The image processing method of claim 8, wherein the database stores the plurality of predetermined cloud spectra, for each of the plurality of predetermined cloud spectra, a plurality of predetermined cloud thickness values, and for each of the plurality of predetermined cloud spectra and each of the plurality of predetermined cloud thickness values, a plurality of values of the at least one cloud optical property at the plurality of wavelength bands.

12. The image processing method of claim 11, wherein the at least one cloud optical property having the plurality of values stored in the database includes cloud transmittance, the method further comprises determining values of cloud reflectance based on the determined cloud thickness, and said correcting the input image is performed by using the determined values of the cloud reflectance and the retrieved values of the cloud transmittance.

13. The image processing method of claim 11, wherein the at least one cloud optical property having the plurality of values stored in the database includes cloud reflectance and cloud transmittance, said correcting the input image is performed by using the retrieved values of the cloud reflectance and the cloud transmittance.

14. The image processing method of claim 8, further comprising:

extracting a set of spectra of one or more endmembers from the input image; and determining, from the extracted set of spectra and the extracted cloud spectrum, the cloud thickness at each pixel of the plurality of pixels in the input image.

15. The image processing method of claim 8, further comprising:

comparing the determined cloud thickness at each pixel of the plurality of pixels with a predetermined threshold;

generating a cloud mask including pixels where the determined cloud thickness is not lower than the predetermined threshold;

overlaying or incorporating the generated cloud mask over or into the corrected image to obtain a processed image; and outputting the processed image.

16. A non-transitory, computer-readable medium containing therein instructions which, when executed by at least one processor, cause the at least one processor to perform extracting, from an input image, a cloud spectrum across a plurality of wavelength bands of the input image;

determining a cloud thickness at each pixel of a plurality of pixels in the input image;

accessing a parameter database contained in at least one storage device and storing
- a plurality of predetermined cloud spectra, and
- a plurality of corresponding parameters of at least one model of cloud transmittance;

retrieving, from the parameter database, parameters of the at least one model of the cloud transmittance at the plurality of wavelength bands, the retrieved parameters corresponding to the extracted cloud spectrum;

determining values of the cloud transmittance at the plurality of wavelength bands by applying (i) the parameters retrieved from the parameter database, and (ii) the extracted cloud spectrum to the at least one model;

determining values of the cloud reflectance based on the determined cloud thickness and the extracted cloud spectrum; and correcting the input image, by using the determined values of the cloud transmittance and the cloud reflectance, to remove clouds from the input image to obtain a corrected image.

17. The non-transitory, computer-readable medium of claim 16, wherein the instructions, when executed by the at least one processor, further cause the at least one processor to perform:

retrieving the at least one model from the parameter database together with the retrieved parameters.

18. The non-transitory, computer-readable medium of claim 16, wherein the instructions, when executed by the at least one processor, further cause the at least one processor to perform accessing a training data database contained in at least one storage device and storing training data in the form of pairs of cloudy and clear images of an area, or cloud transmittance and cloud reflectance values for a plurality of cloud types, cloud thickness values, and wavelength bands;

deriving the at least one model and parameters of the at least one model, by using the training data stored in the training data database; and storing the derived at least one model and parameters thereof in the parameter database for subsequent retrieval.

19. The non-transitory, computer-readable medium of claim 16, wherein the instructions, when executed by the at least one processor, further cause the at least one processor to perform extracting a set of spectra of one or more endmembers from the input image; and determining, from the extracted set of spectra and the extracted cloud spectrum, the cloud thickness at each pixel of the plurality of pixels in the input image.

20. The non-transitory, computer-readable medium of claim 16, wherein the instructions, when executed by the at least one processor, further cause the at least one processor to perform comparing the determined cloud thickness at each pixel of the plurality of pixels with a predetermined threshold;

generating a cloud mask including pixels where the determined cloud thickness is not lower than the predetermined threshold;

overlaying the generated cloud mask over the corrected image to obtain a processed image; and outputting the processed image.

* * * * *